United States Patent [19]

Smith et al.

[11] Patent Number: 4,519,034
[45] Date of Patent: May 21, 1985

[54] I/O BUS CLOCK

[75] Inventors: Gehrard J. Smith, Santa Clara; Kenneth Holly, San Jose, both of Calif.

[73] Assignee: ELXSI, San Jose, Calif.

[21] Appl. No.: 426,046

[22] Filed: Sep. 28, 1982

Related U.S. Application Data

[63] Continuation-in-part of Ser. No. 393,860, Jun. 30, 1982.

[51] Int. Cl.³ .................................................. G06F 1/04
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,047,201 | 9/1977 | Kerllenevich | 364/200 |
| 4,053,950 | 10/1977 | Bourke et al. | 364/200 |
| 4,056,843 | 11/1977 | Bishop et al. | 364/200 |
| 4,079,448 | 3/1978 | N'Guyen et al. | 364/200 |
| 4,335,426 | 6/1982 | Maxwell et al. | 364/200 |
| 4,365,297 | 12/1982 | Grisham, Jr. | 364/200 |

*Primary Examiner*—Raulfe B. Zache
*Attorney, Agent, or Firm*—Townsend and Townsend

[57] ABSTRACT

Fully synchronous operation is provided by the use of separate frame and clock signals in each of the two directions relative to the IOCP, with all these signals controlled by the IOCP. The transmit (outbound) clock and frame signals (TCLK and TFRM) are simply sent on two lines from the IOCP to a bus terminator at the far end with the devices connecting to these lines in sequence. The receive (inbound) clock and frame signals (RCLK and RFRM) also originate at the IOCP, but their lines go directly to the far end where they are turned around and sent back to the IOCP with the devices being coupled to these lines in the reverse sequence. This provides a pair of signals that travel toward the IOCP but are still controlled by it for timing the incoming data.

20 Claims, 34 Drawing Figures

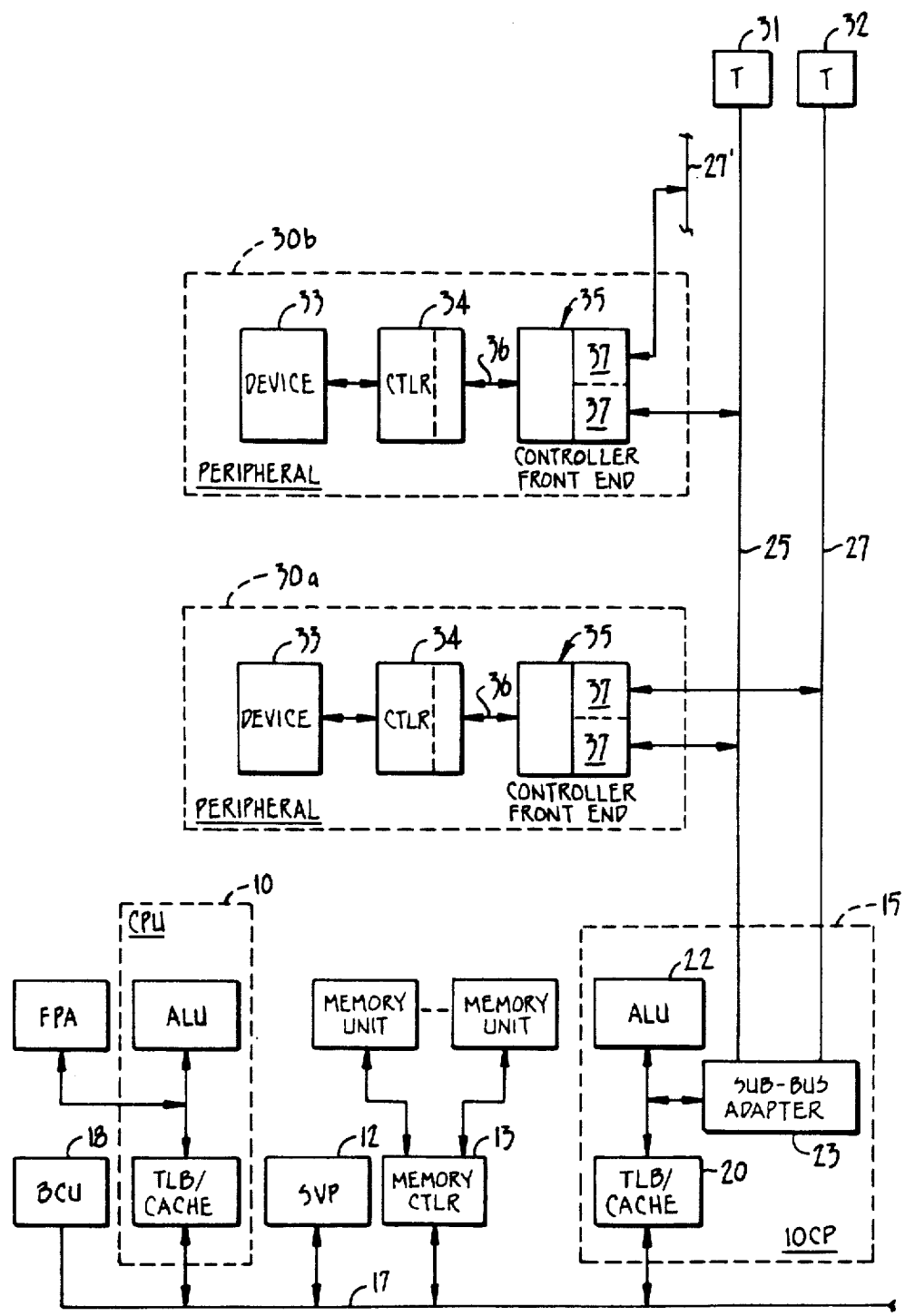
FIG._1.

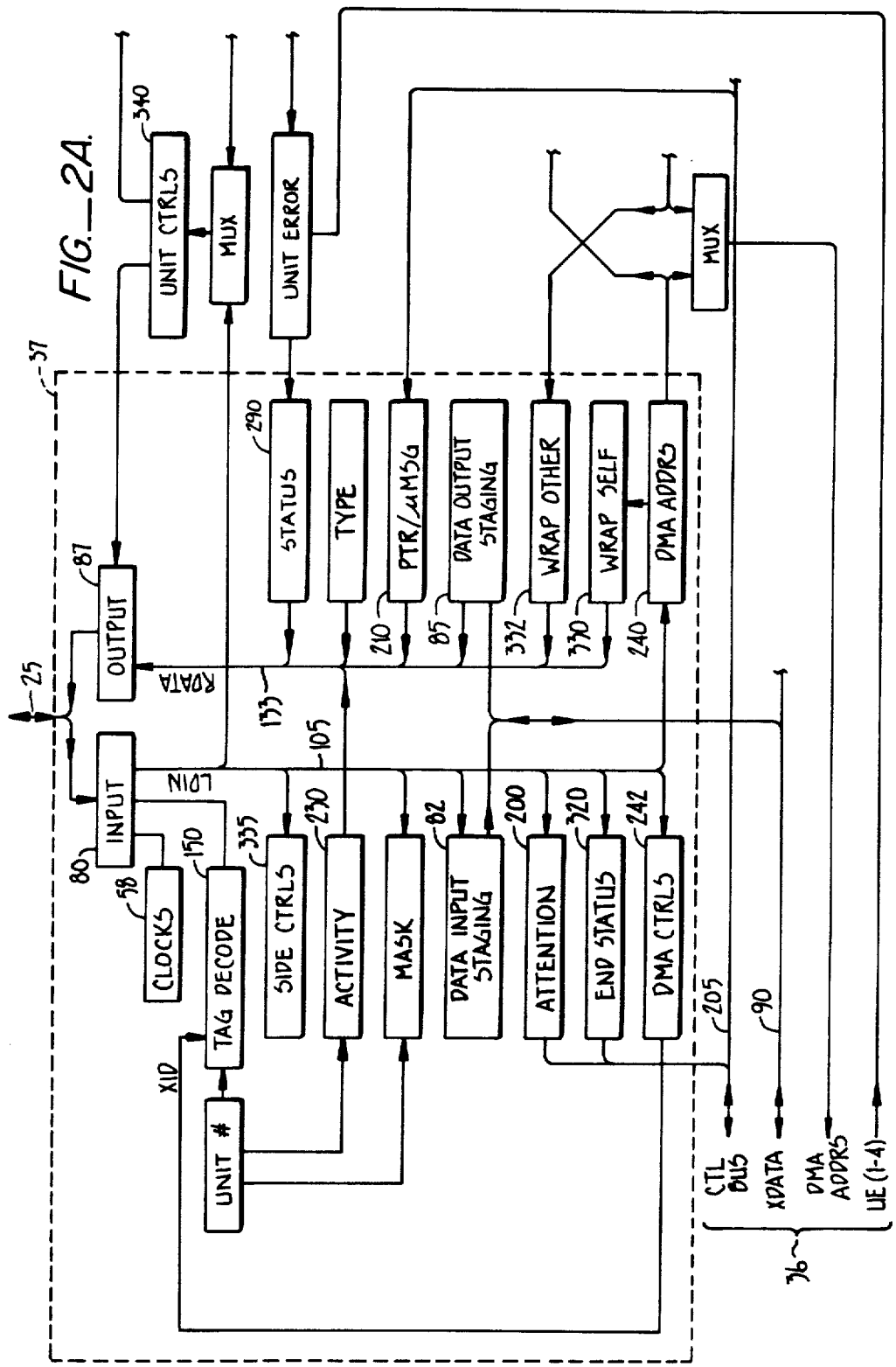

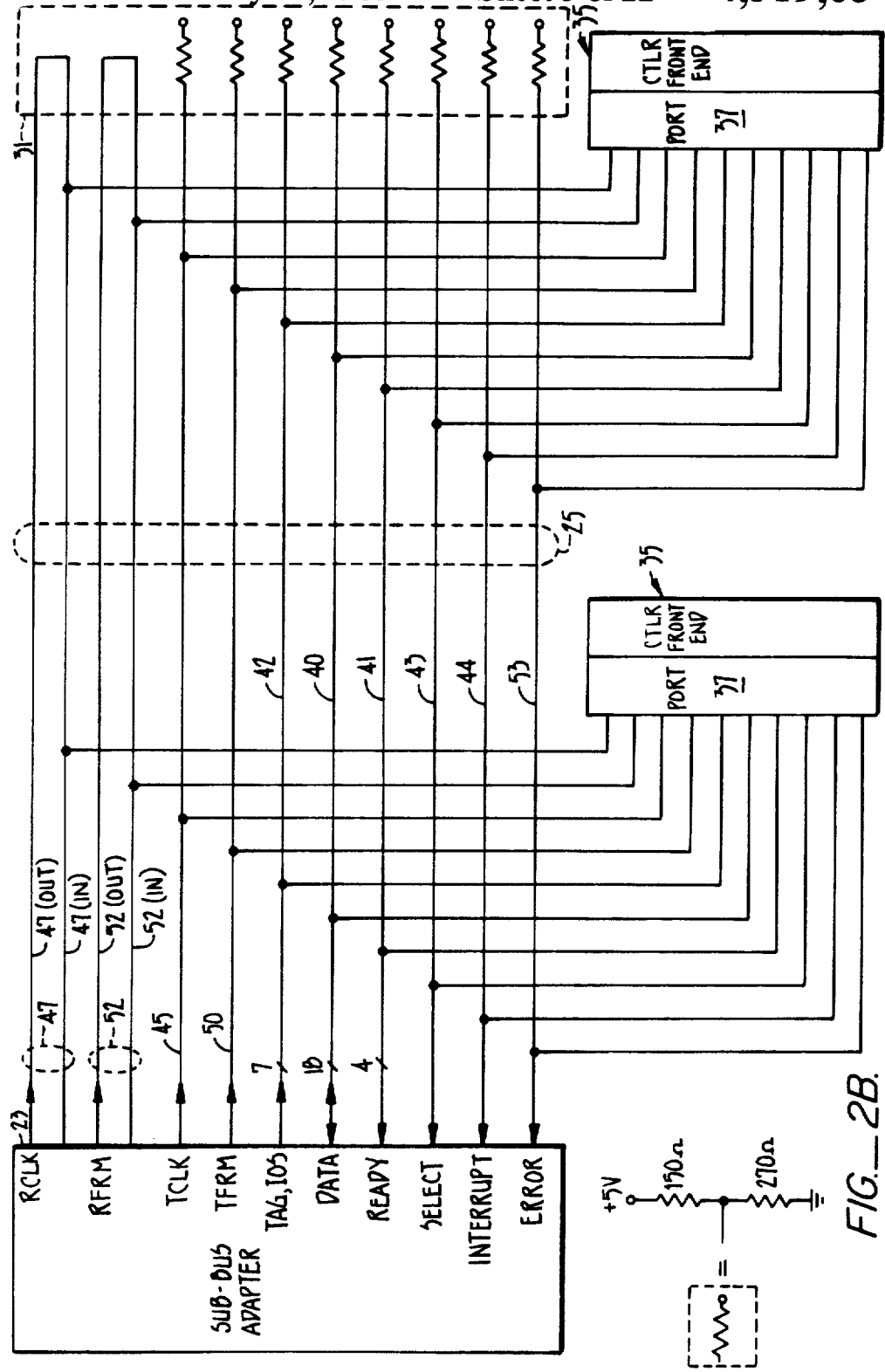
FIG._2B.

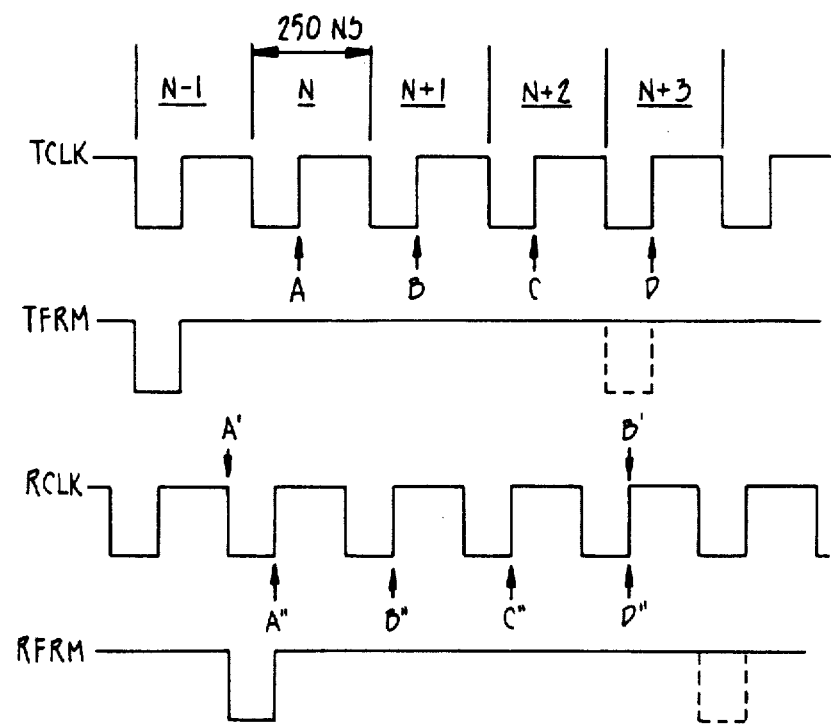
FIG._3.
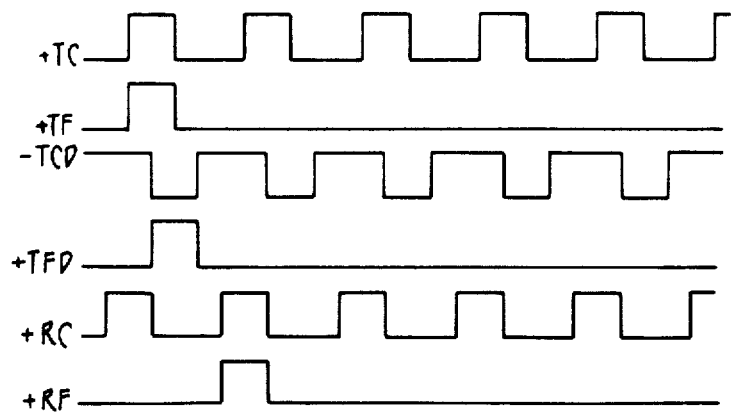
FIG._5.

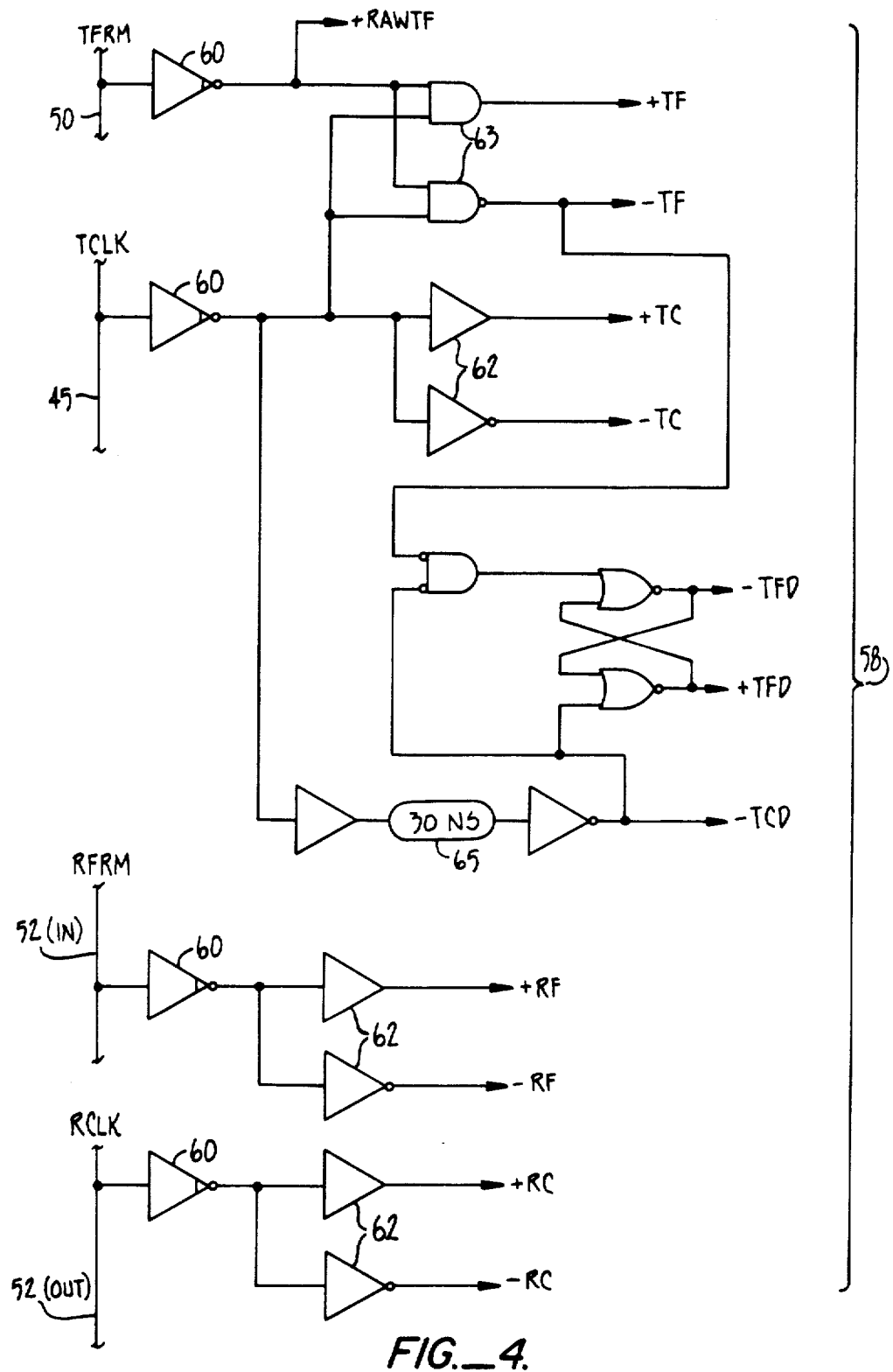
FIG._4.

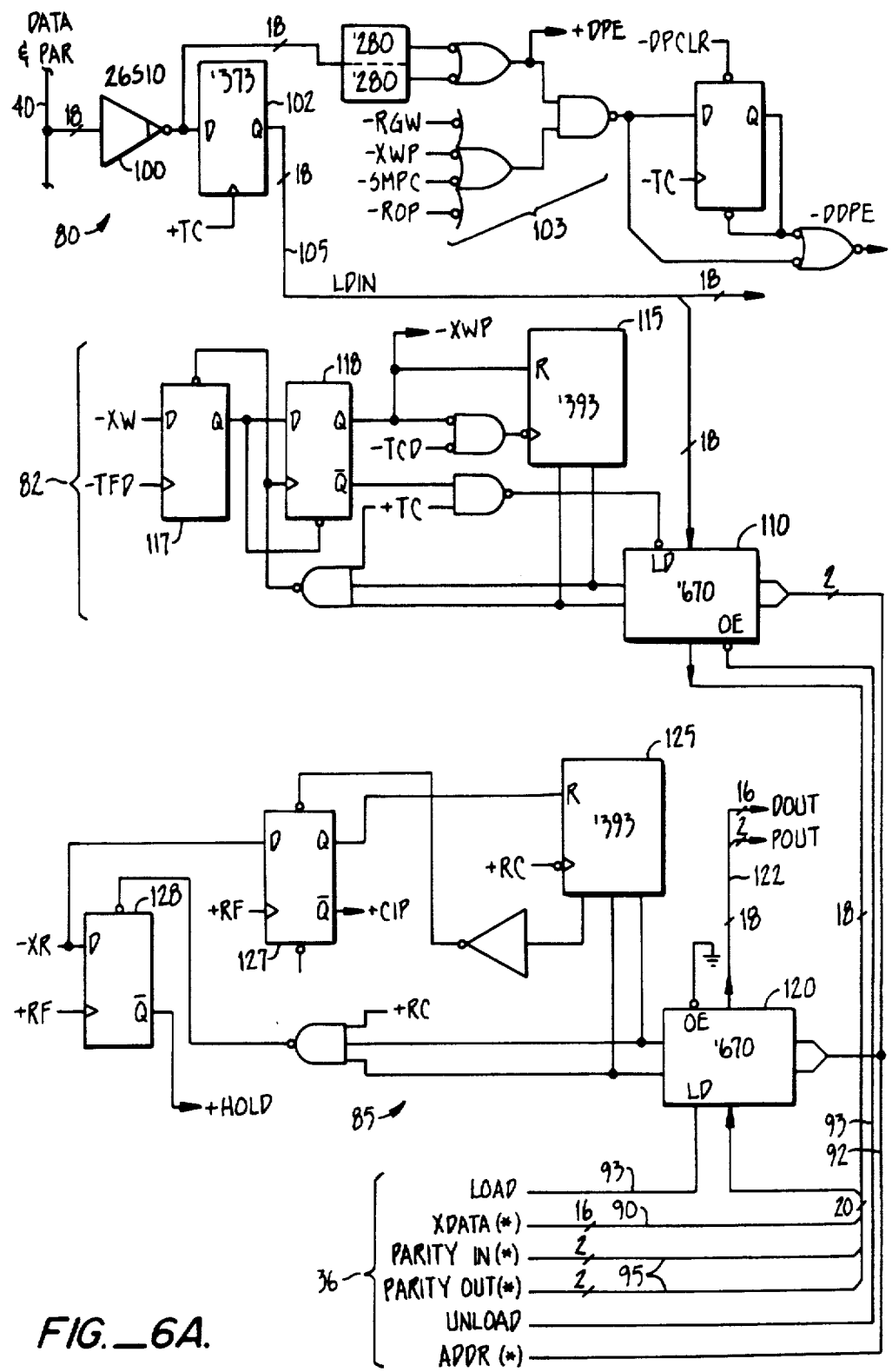
FIG._6A.

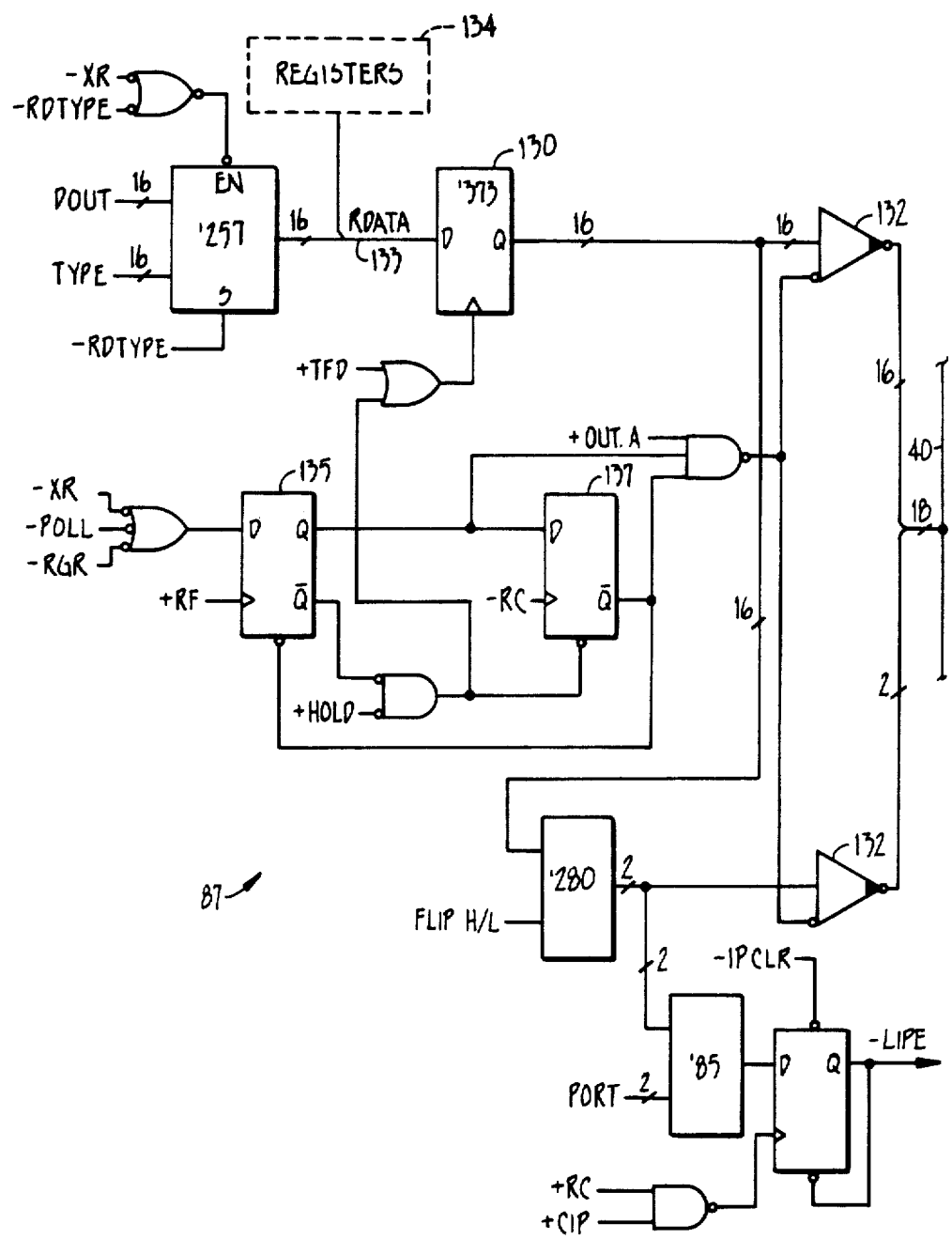
FIG._6B.

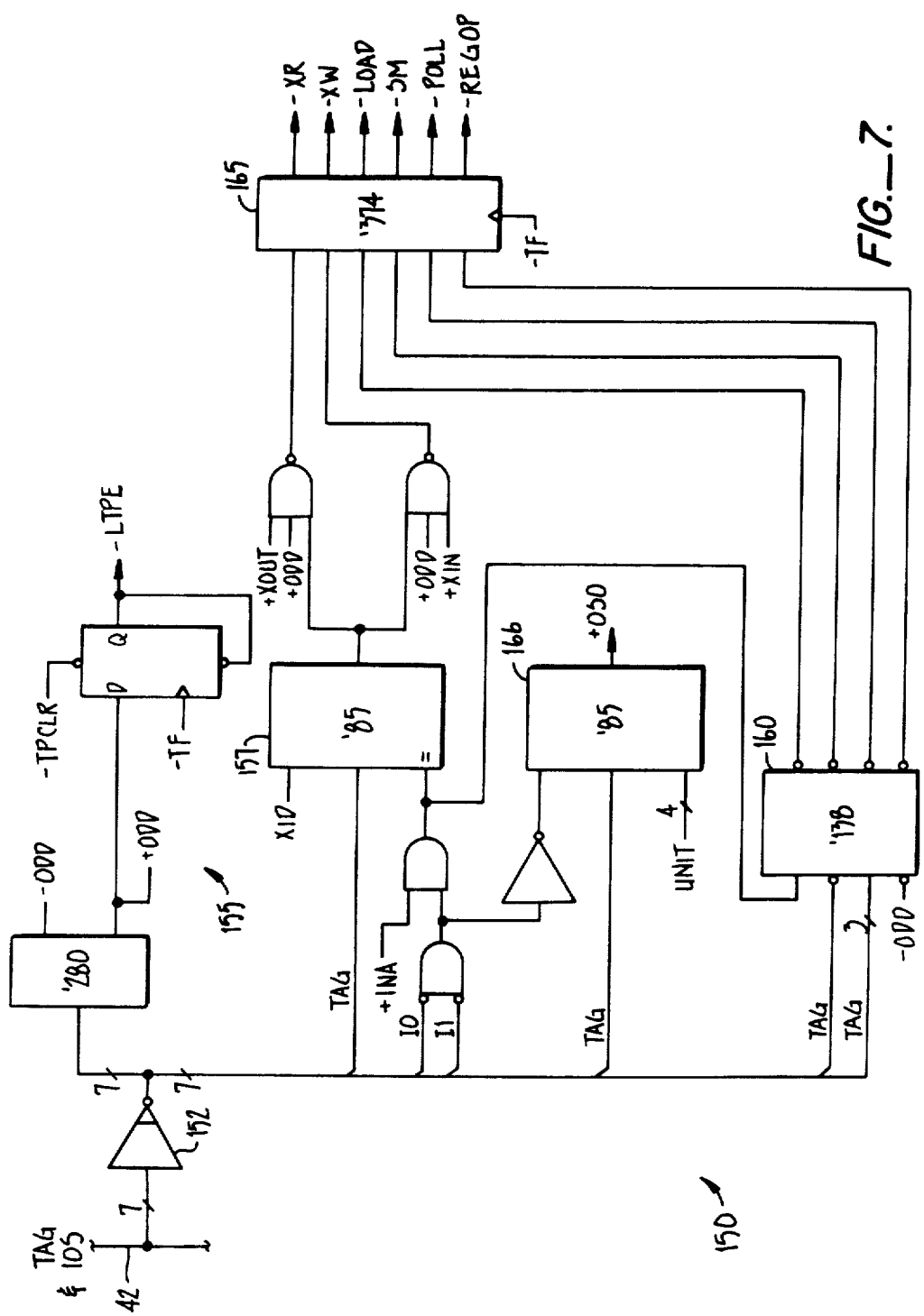
FIG._7.

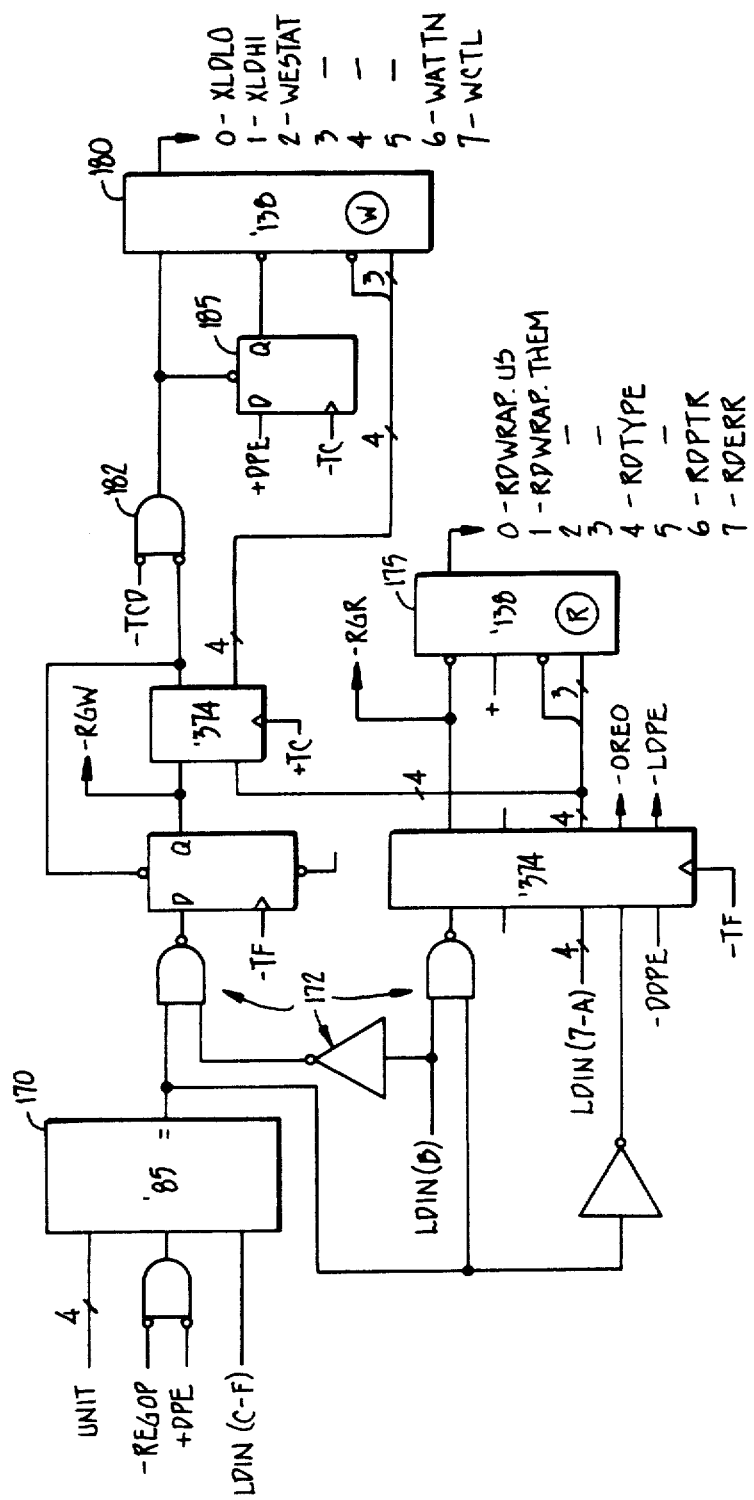
FIG._8.

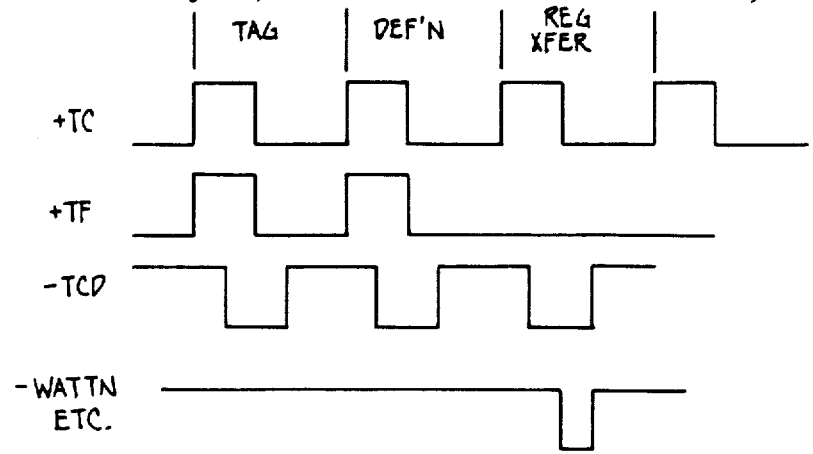
FIG._9.
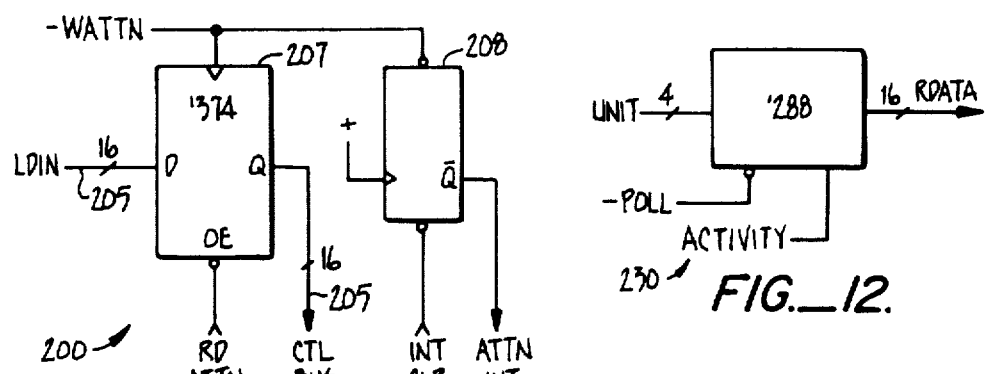
FIG._10.   FIG._12.
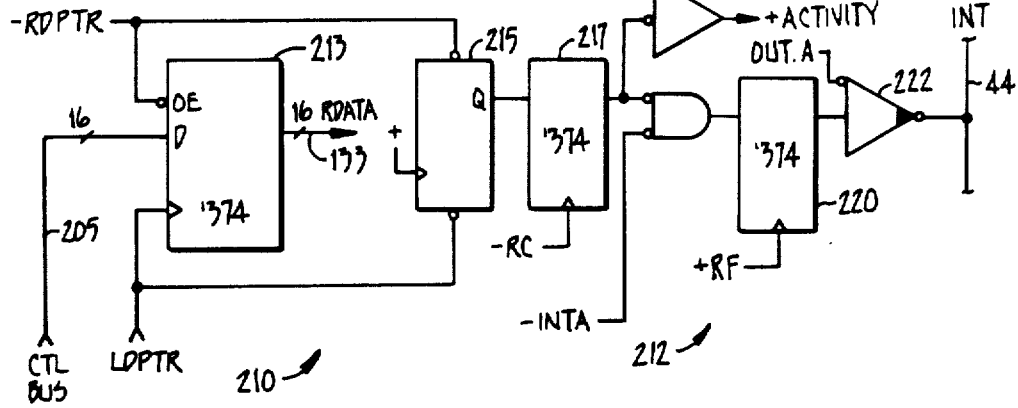
FIG._11.

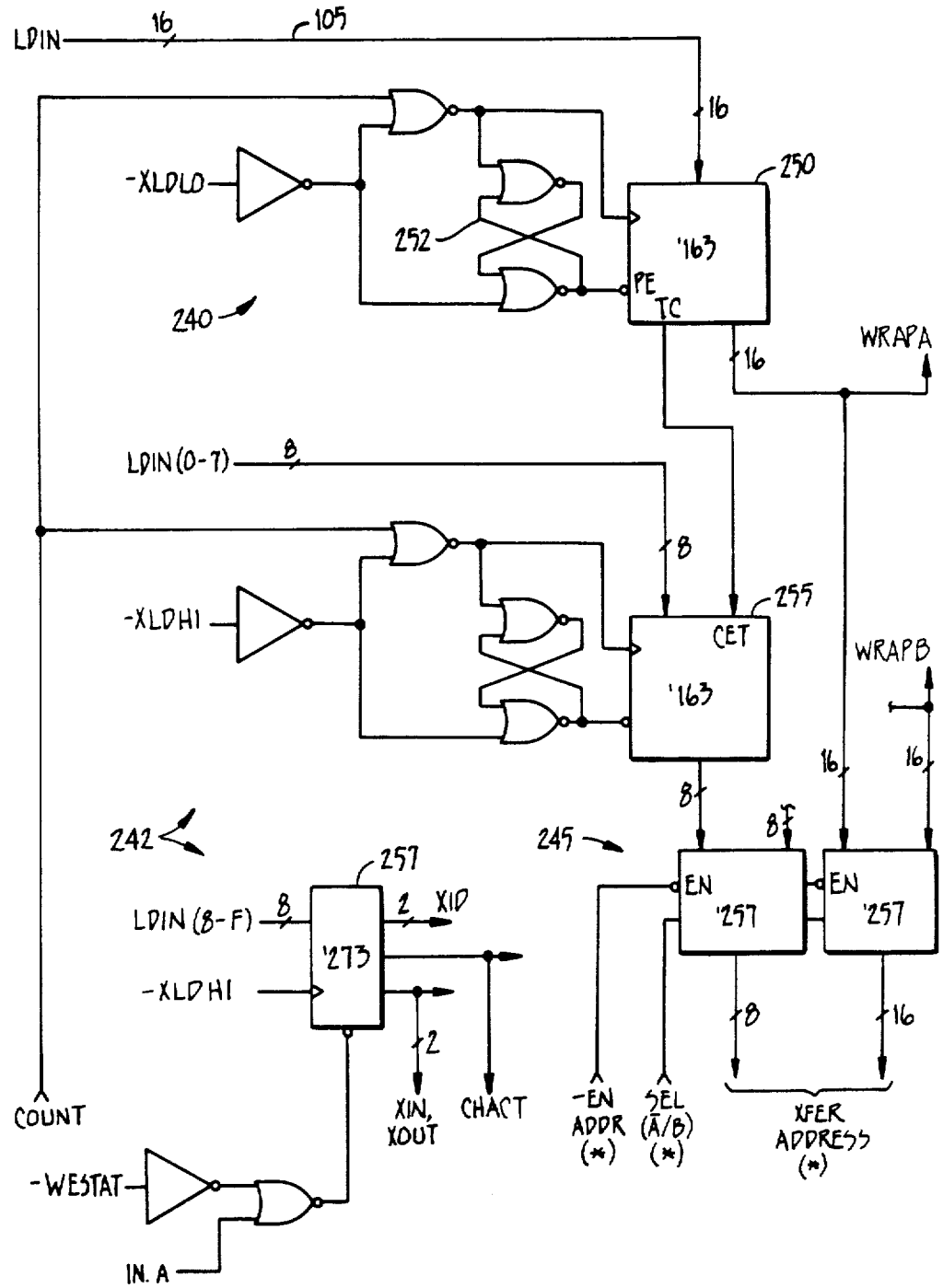
FIG._13.

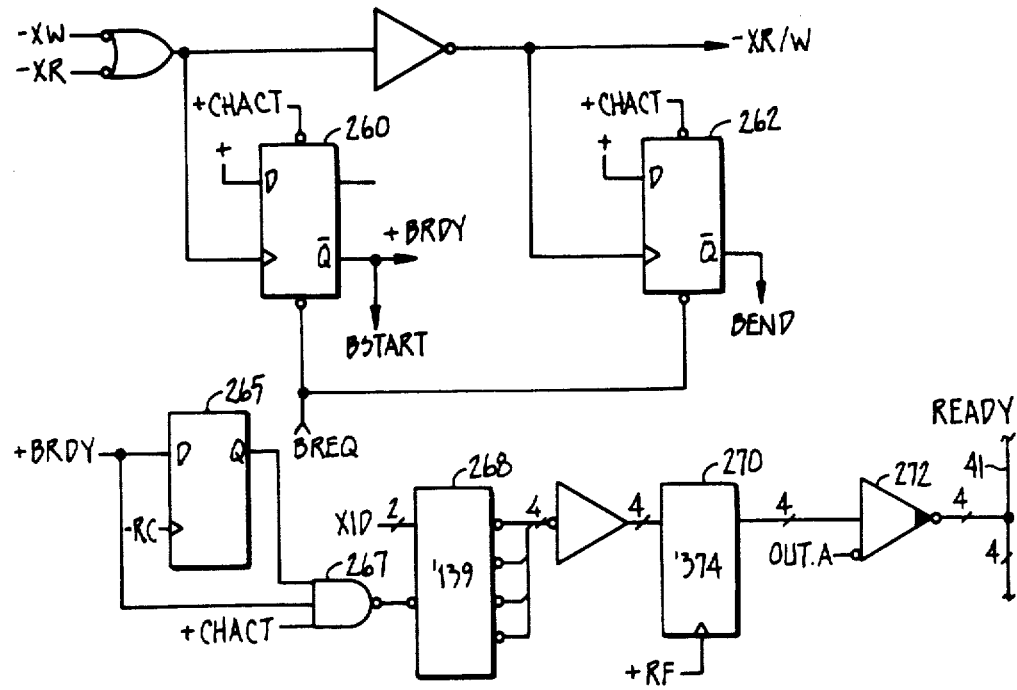
FIG._14.
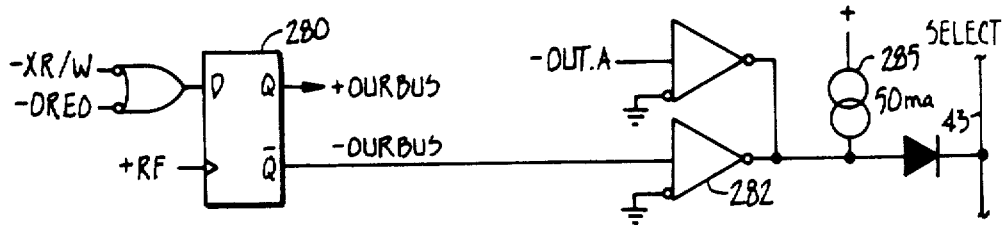
FIG._15.
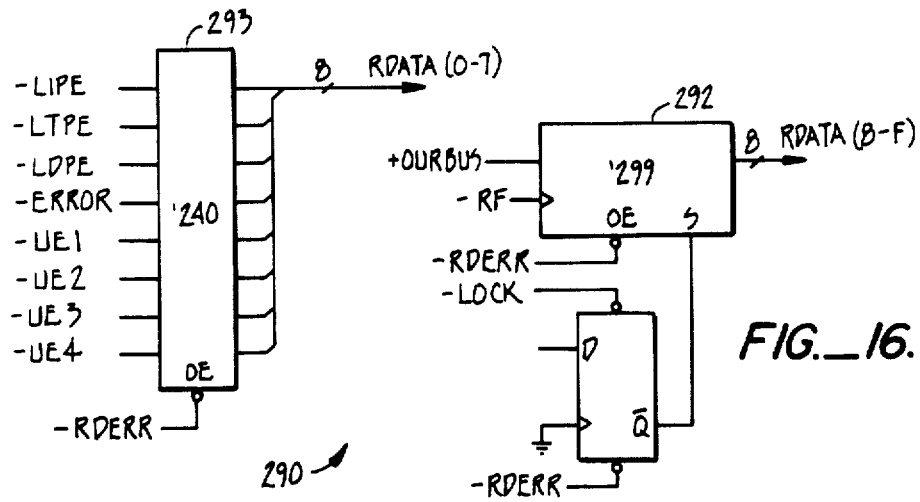
FIG._16.

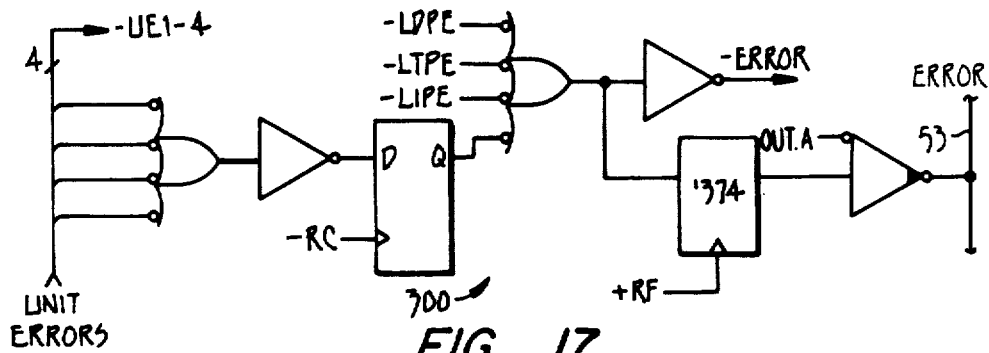
FIG._17.
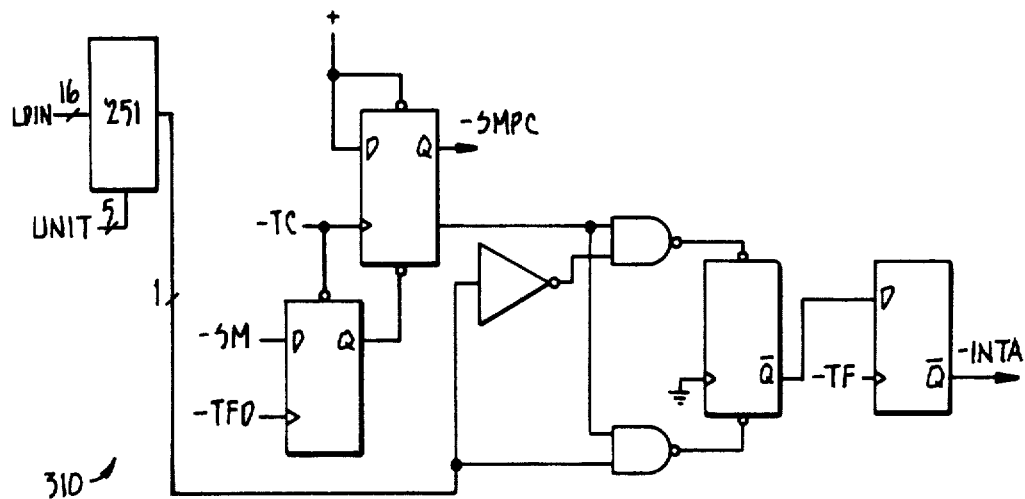
FIG._18.
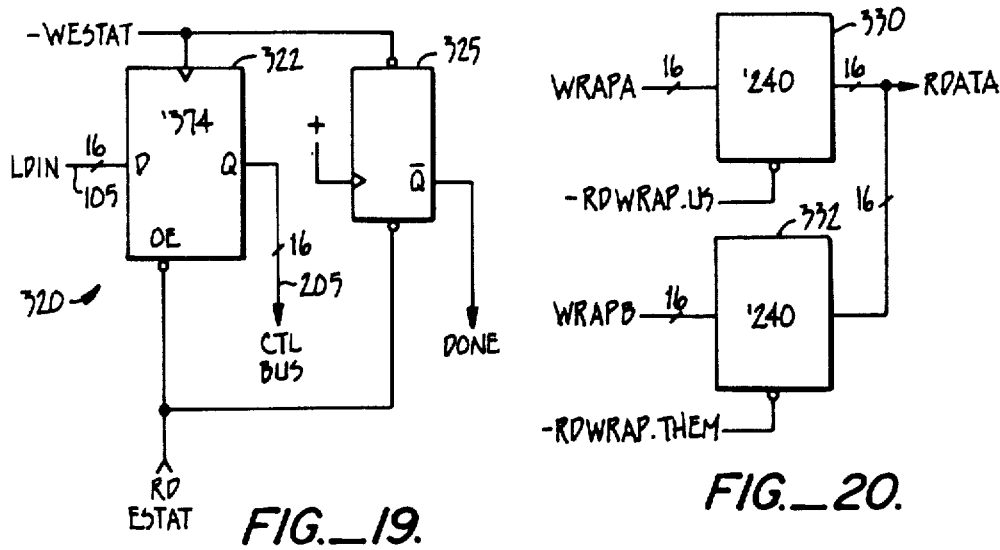
FIG._19.
FIG._20.

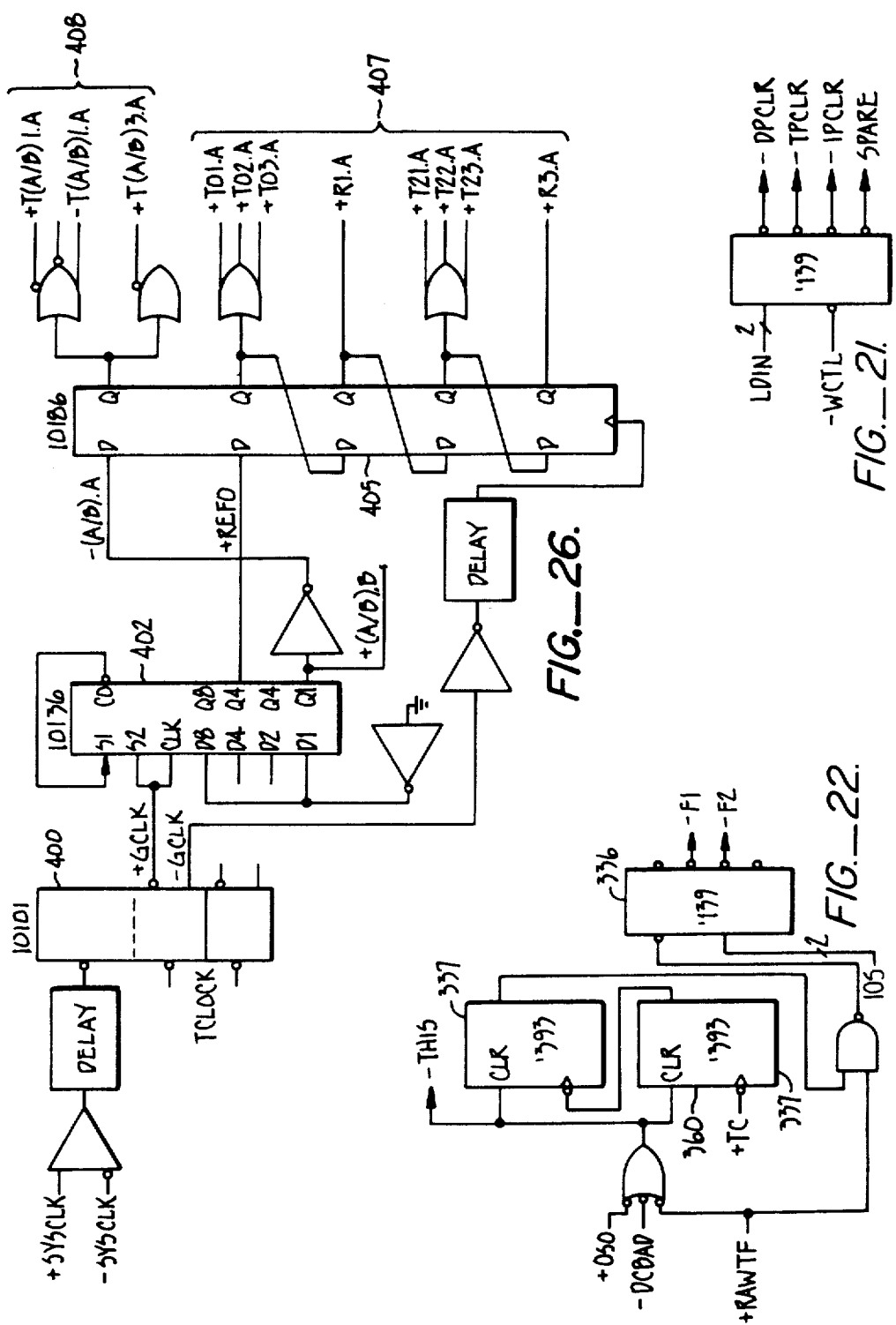

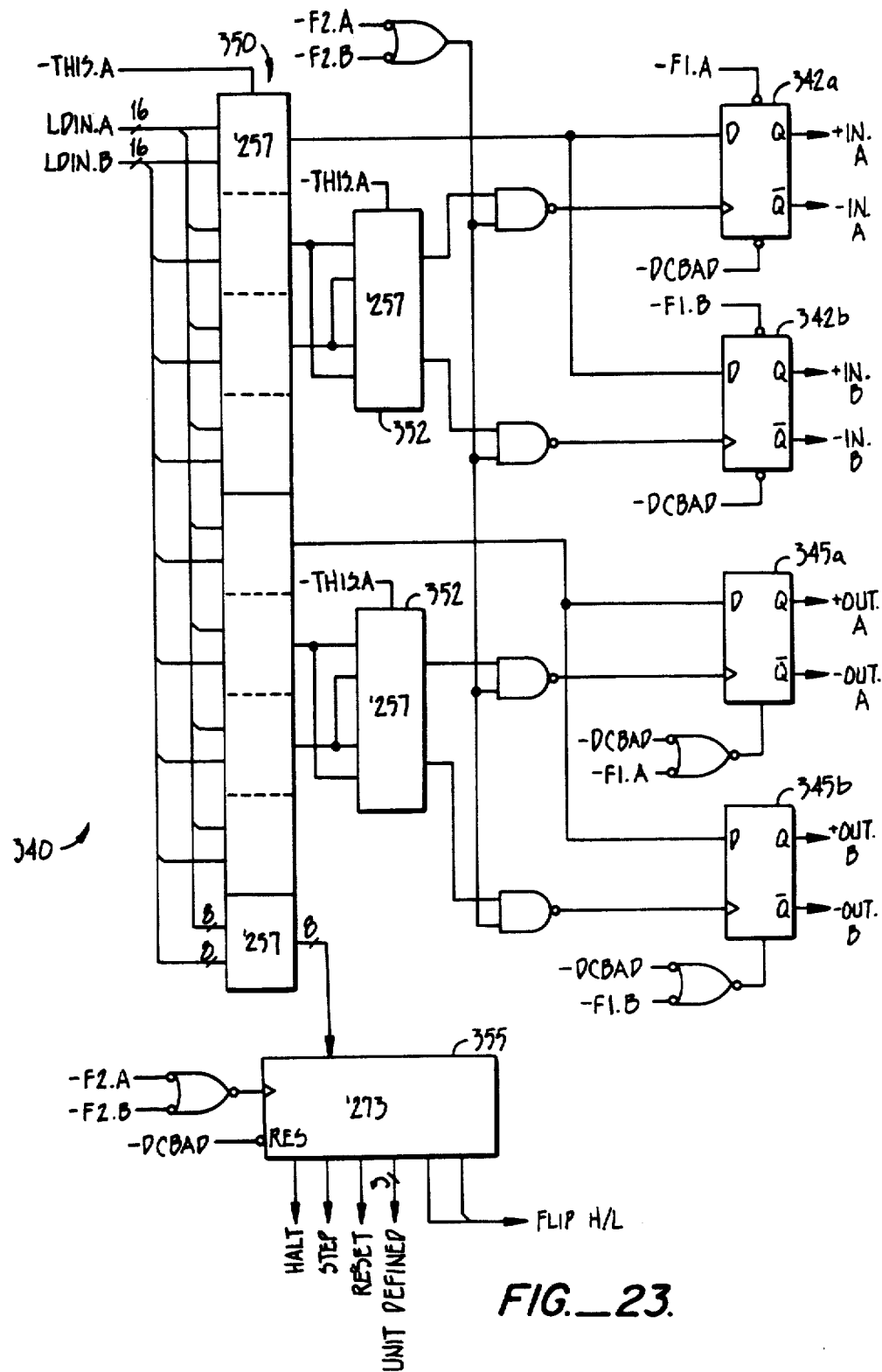
FIG._23.

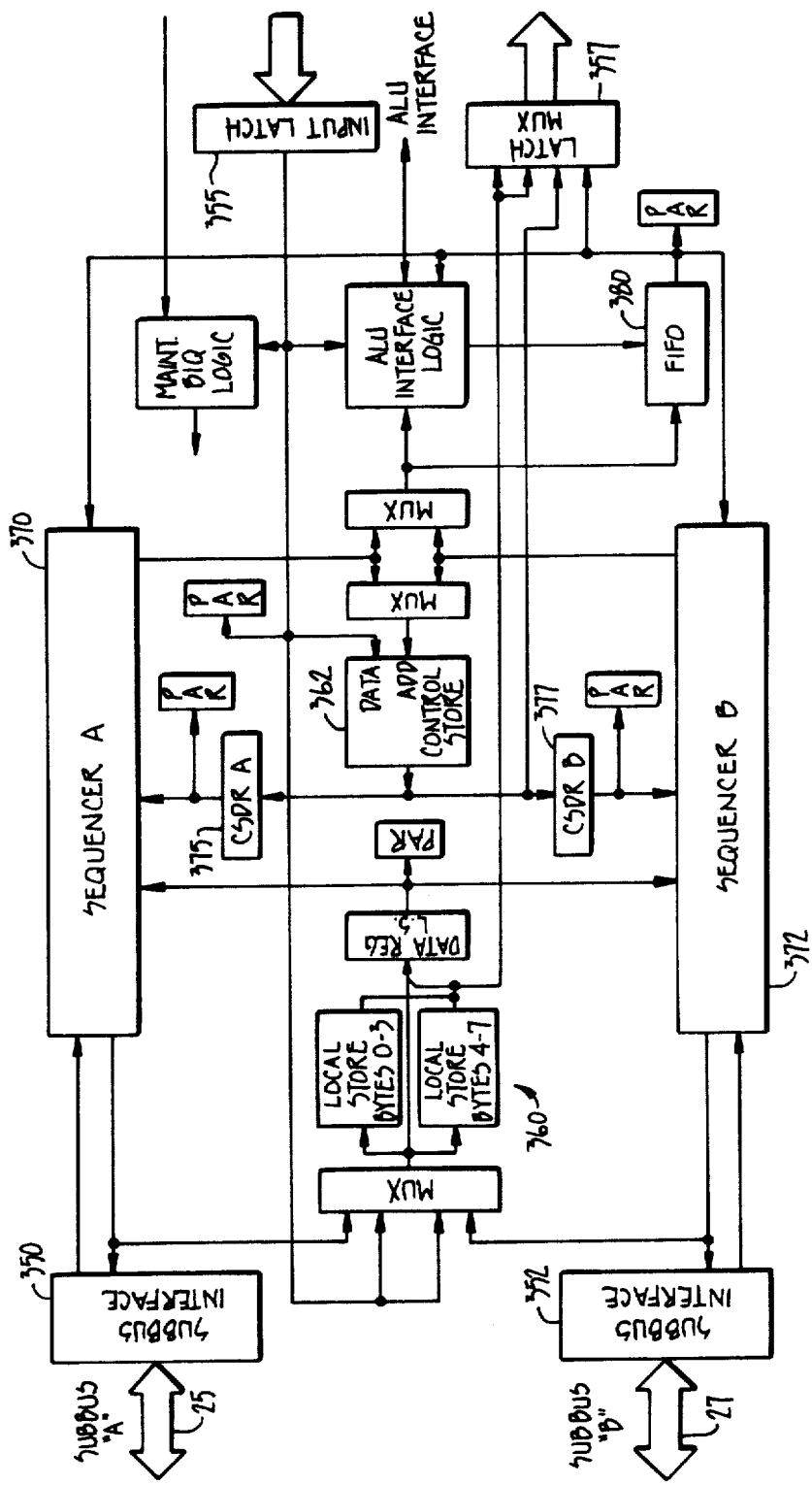
FIG._24.

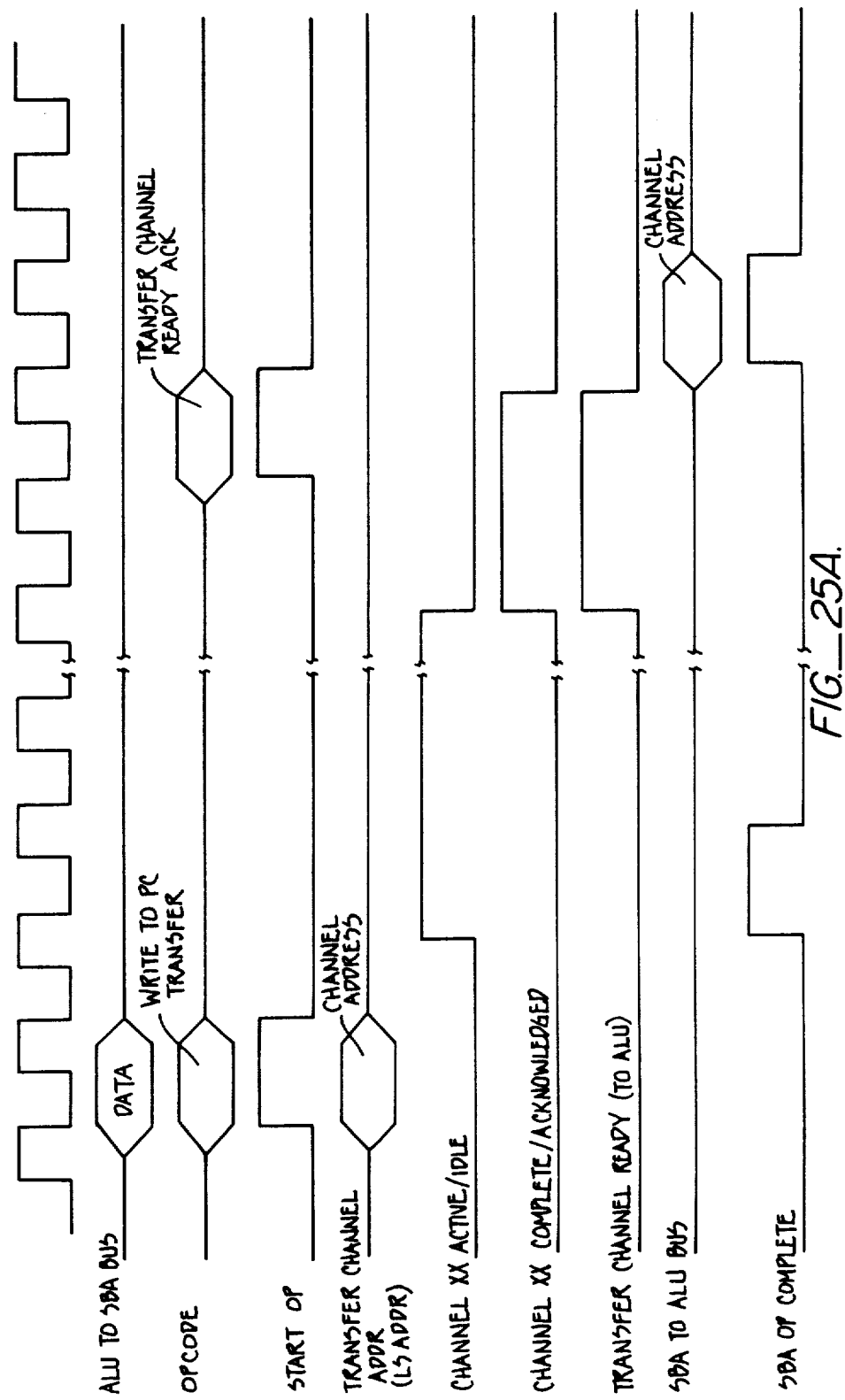

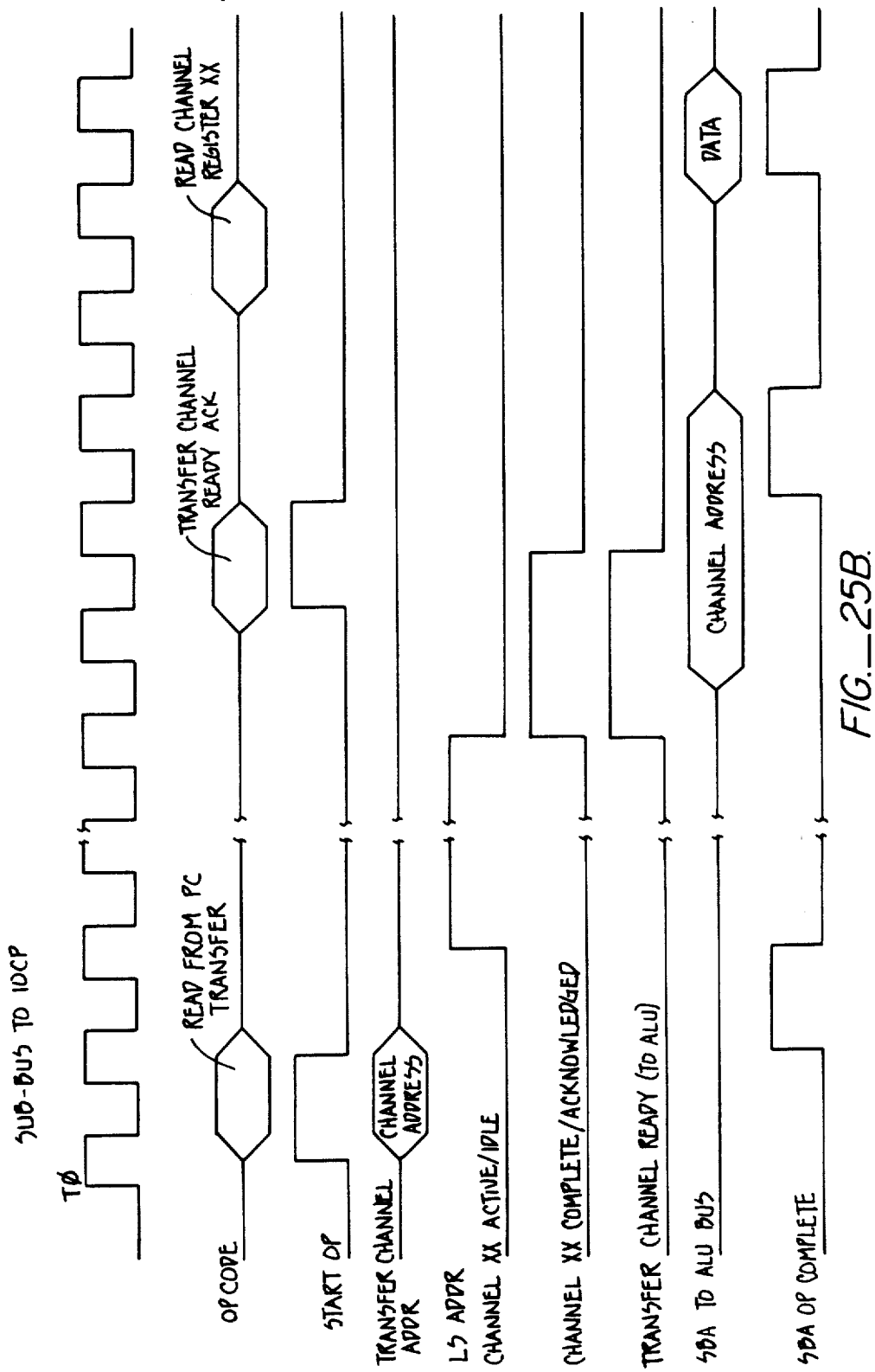
FIG._25B.

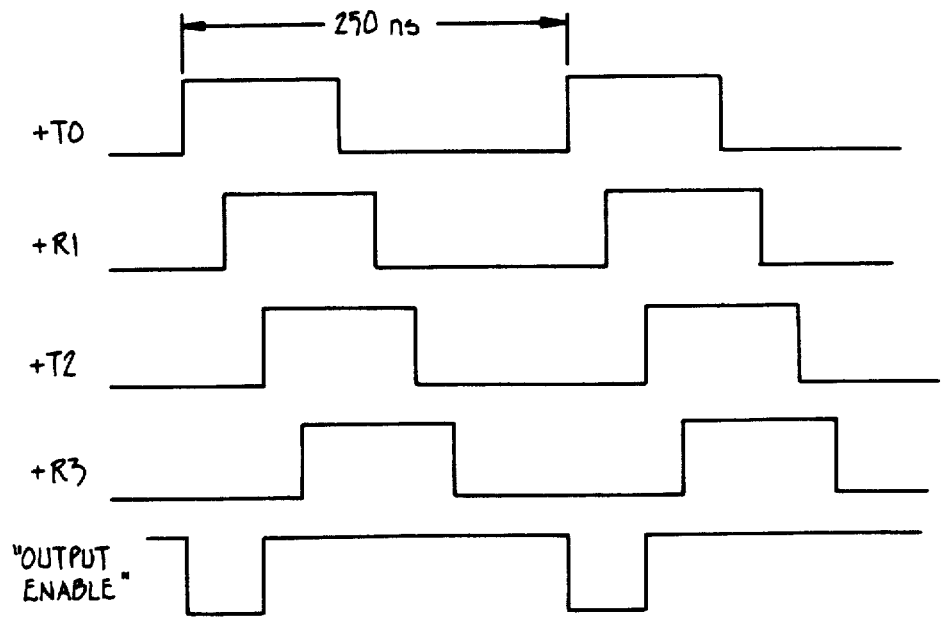
FIG._27.
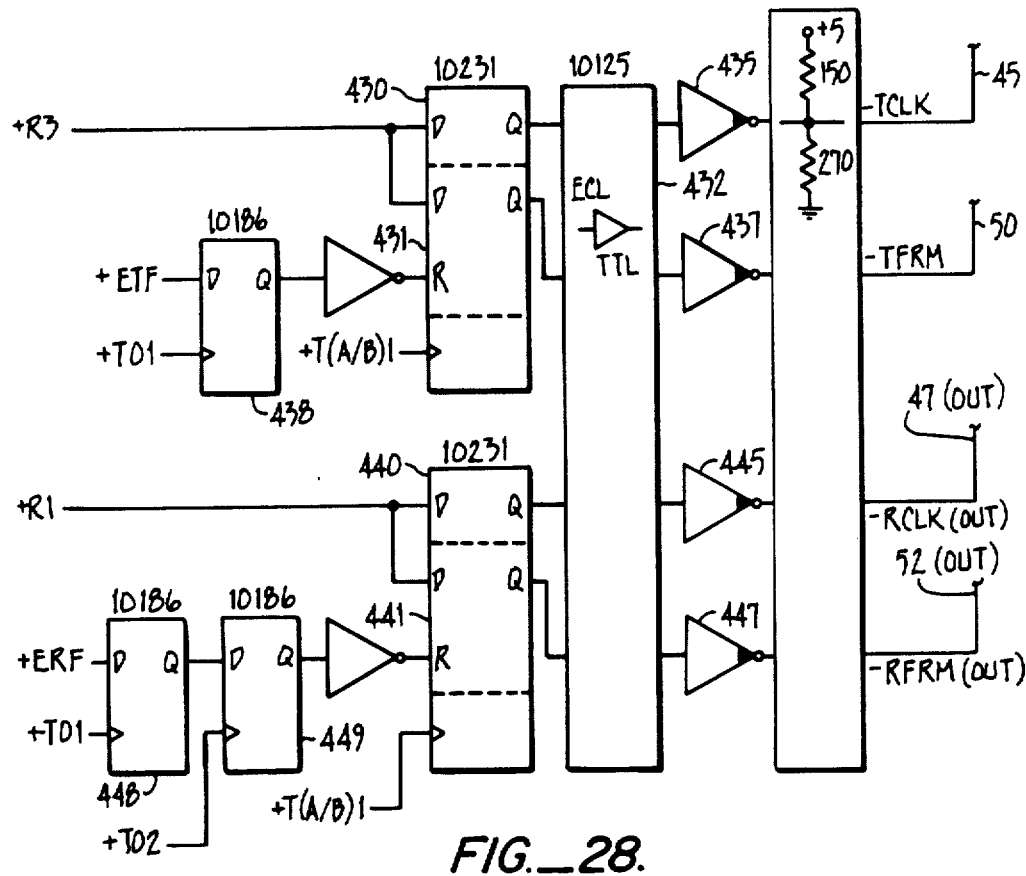
FIG._28.

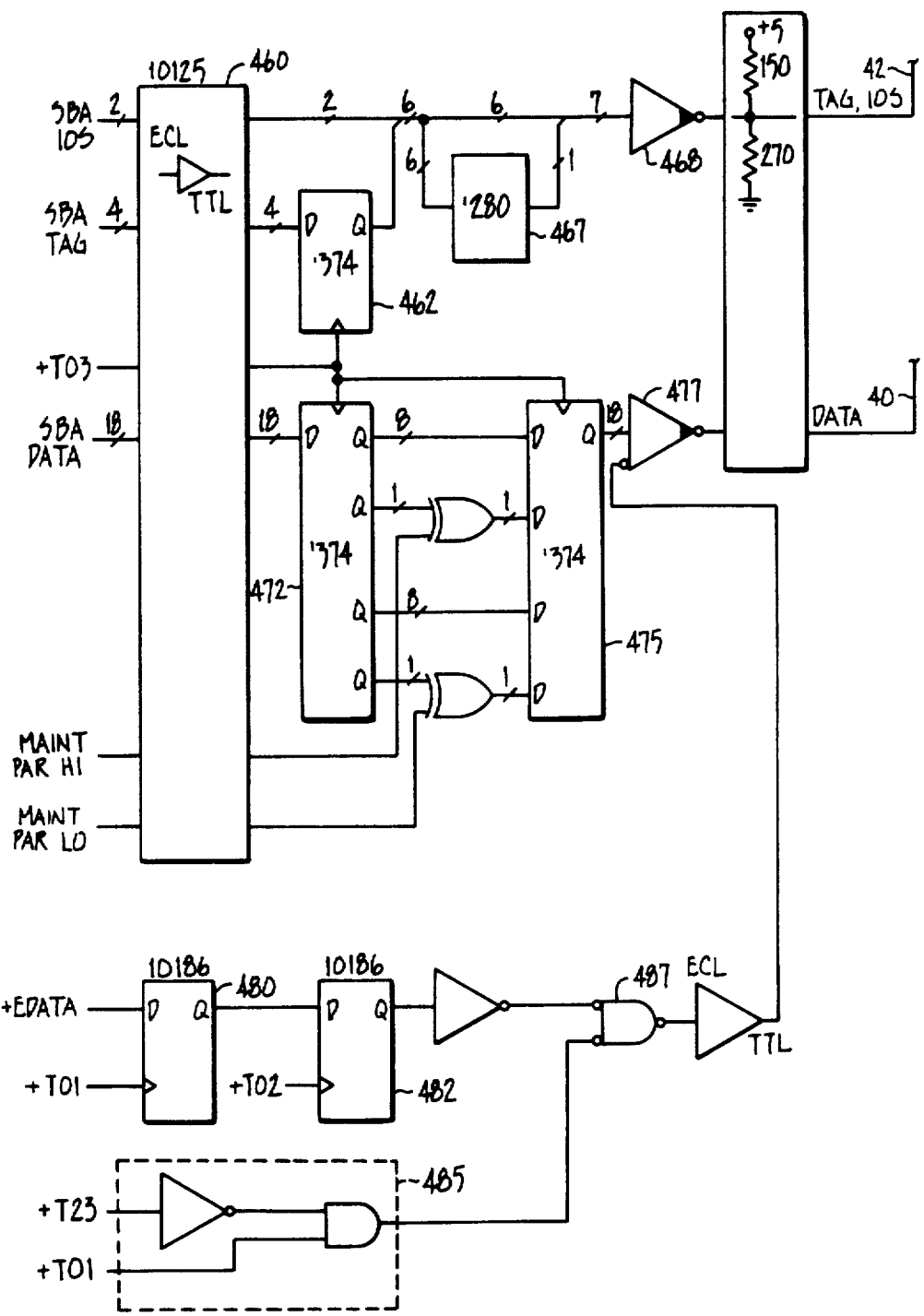
FIG._29.

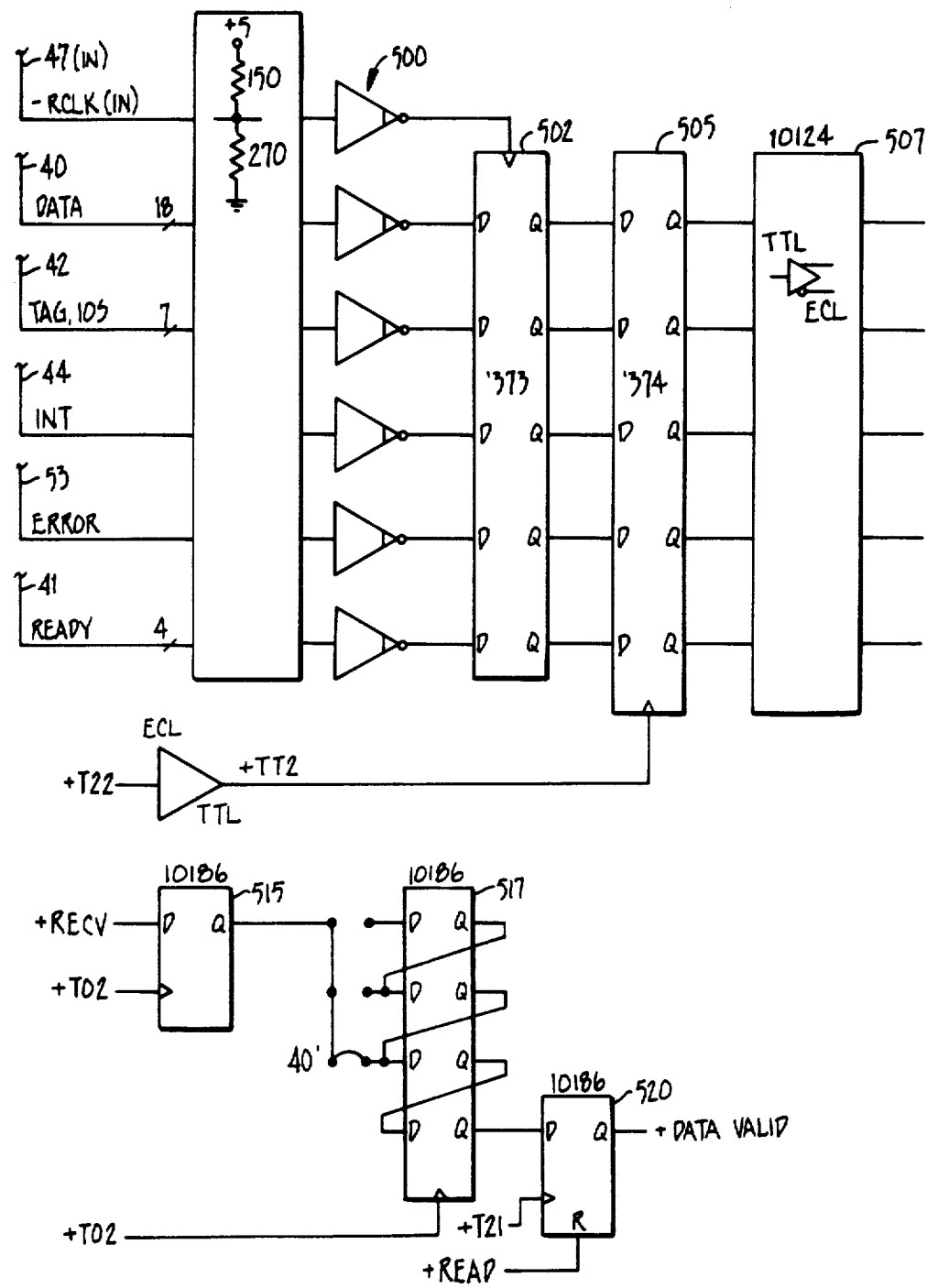
FIG._30.

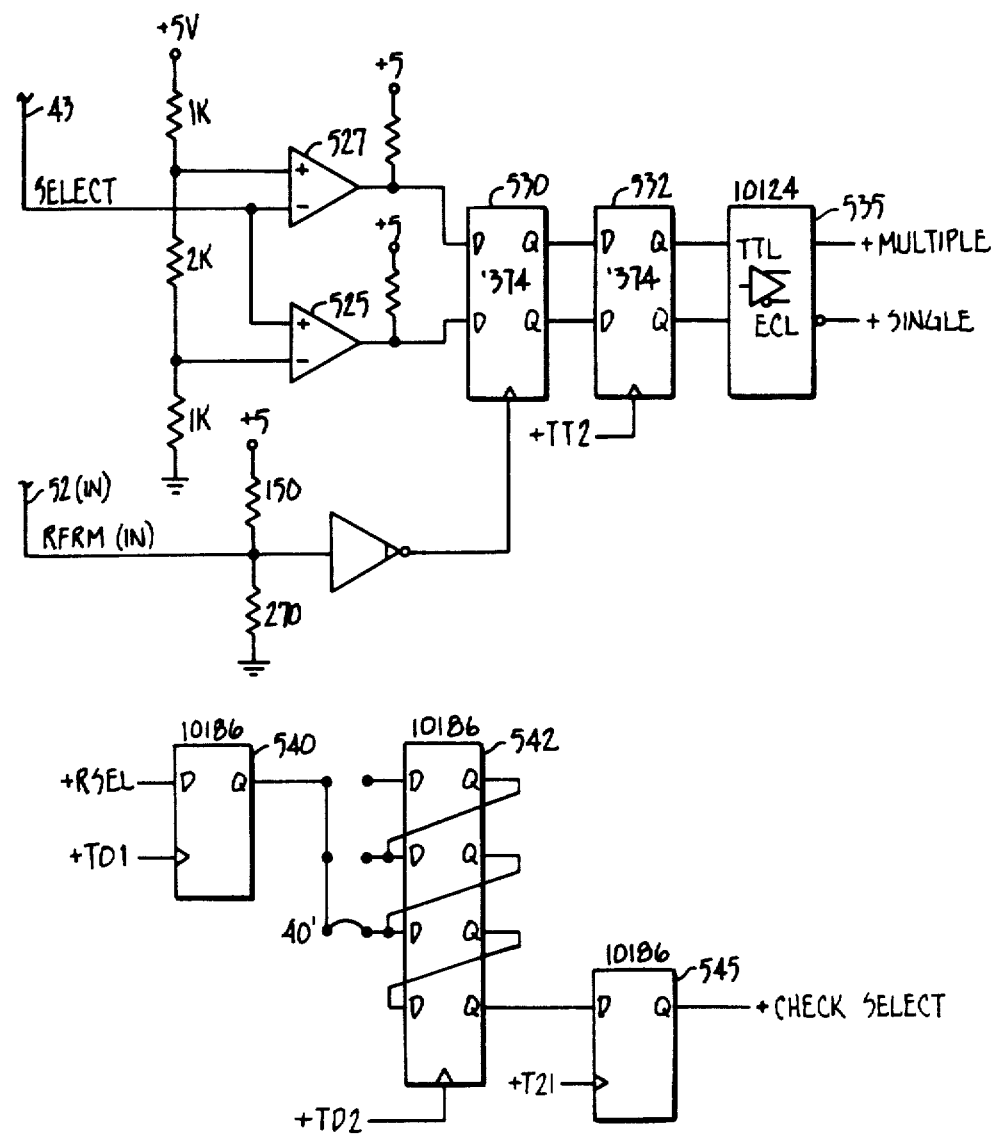
FIG._31.

I/O BUS CLOCK

This application is a continuation-in-part of copending application Ser. No. 393,860, filed June 30, 1982.

FIELD OF THE INVENTION

This invention relates generally to a data processing sub-bus system through which a plurality of peripheral controllers may communicate with other functional units in the overall system, and more particularly to a system for providing synchronous operation.

BACKGROUND OF THE INVENTION

A typical computer system includes a number of peripheral devices (hereinafter often referred to as "peripherals" or "devices") that provide mass storage for the system and allow communication outside the system. These peripherals include disk drives, tape drives, terminals, and the like. However, the peripherals normally operate on a time scale that is at least an order of magnitude slower than the operation of other functional units within the system. While it is a known practice to interface peripheral controllers directly to a main system bus, this usually requires a large amount of overhead associated with each peripheral controller. Accordingly, it is a known practice to couple the peripheral controllers to a peripheral sub-bus, and to provide an intelligent I/O channel processor (hereinafter "IOCP") for controlling communication between the sub-bus and the main system bus. The sub-bus differs from the system bus in that it is significantly longer and operates at a lower speed. To simplify terminology, the peripheral sub-bus will often be referred to simply as the "bus." Directions on the bus will be designated relative to the IOCP, with terms such as "transmit" and "outbound" referring to communications from the IOCP, and terms such as "receive" and "inbound" referring to communications to the IOCP.

Any bus system requires that the data be timed with respect to some clock signal for validation. In the case of a bi-directional bus, such validation is needed in both directions. Prior art buses have generally been sufficiently short or sufficiently slow that the signal propagation time between devices on the bus has not proved problematical. In such cases, a single clock line from the IOCP to the devices in sequential party line fashion has sufficed. A receiving device latches the bus data in at a predetermined time in the clock cycle; a sending device places its data on the bus at another predetermined time in the clock cycle.

However, attempts to operate with faster and/or longer buses have necessitated a variety of asynchronous approaches, since the time at which the data comes back to the IOCP becomes increasingly indeterminate with respect to the clock signal at the IOCP. One prior art asynchronous approach has the IOCP remove its own data or instruction from the bus and then merely wait for the state of the bus lines to change. The change in bus state then signifies that the expected response is available. However, the IOCP must either sample the bus to make sure that the data has stabilized, or alternately, delay reading the bus for some predetermined time interval.

An alternate prior art asynchronous approach uses an outbound clock generated by the IOCP and an inbound clock generated by the device sending information back to the IOCP. However, since the two clocks are not synchronized with respect to one another, there may still occur situations where the relevant inbound clock transition occurs at a time when the IOCP is undergoing some internal transition in synchronization with its own (outbound) clock.

SUMMARY OF THE INVENTION

The present invention provides a clock system that allows fully synchronous operation, even when the propagation time along the bus is greater than a bus cycle.

Fully synchronous operation is provided by the use of separate frame and clock signals in each of the two directions relative to the IOCP, with all these signals controlled by the IOCP. The transmit (outbound) clock and frame signals (TCLK and TFRM) are simply sent on two lines from the IOCP to a bus terminator at the far end with the devices connecting to these lines in sequence. The receive (inbound) clock and frame signals (RCLK and RFRM) also originate at the IOCP, but their lines go directly to the far end where they are turned around and sent back to the IOCP with the devices being coupled to these lines in the reverse sequence. This provides a pair of signals that travel toward the IOCP but are still controlled by it for timing the incoming data.

The transmit frame (TFRM) signal is used to indicate the start of a new bus operation, and as such, qualifies these portions of the bus data that are used to identify the next operation. The issuance of TFRM is timed by the IOCP and the frequency varies with respect to the operation and the physical bus length. In addition to allowing the requisite number of cycles for the operation, additional delays may be required for long buses to allow the tags and data to propagate along the bus. The transmit clock (TCLK) runs continuously and is used to time data movements from the IOCP when indicated by a previous TFRM signal. It should be noted that use of the TFRM signal allows the TCLK signal to run at full speed so that the data rate is maintained while confusion on the bus is avoided.

The receive frame (RFRM) signal is used to establish frame timing of the response data going to the IOCP. For example, if a previous TFRM indicated a data read involving several bus cycles, the addressed device would wait for the RFRM signal prior to starting the response transfer. In this way, even though the timing clocks are still running, they will not be confused, as devices would only use those clock signals occurring after the next RFRM signal, thereby avoiding the problem of clocking the data on an earlier RCLK cycle.

For a further understanding of the nature and advantages of the present invention, reference should be made to the remaining portions of the specification and to the attached drawings.

BRIEF DESCRIPTION OF THE DRAWINGS

FIG. 1 is an overall block diagram of a computer system illustrating the I/O channel bus;

FIG. 2A is a block diagram of one of the peripheral controller front ends;

FIG. 2B is a block diagram illustrating the manner in which the controller front ends are coupled to the I/O channel bus;

FIG. 3 is a timing diagram of the clock signals at the IOCP;

FIG. 4 is a schematic of the clock input circuitry within a peripheral controller port;

FIG. 5 is a timing diagram of clock signals at the port;

FIG. 6A is a schematic of the input and data staging circuitry within the port;

FIG. 6B is a schematic of the output circuitry within the port;

FIG. 7 is a schematic of the tag decoding circuitry within the port;

FIG. 8 is a schematic of the circuitry within the port for identifying register operations;

FIG. 9 is a timing diagram of the register write signals;

FIG. 10 is a schematic of the port's attention register;

FIG. 11 is a schematic of the port's pointer register;

FIG. 12 is a schematic of the port's activity register;

FIG. 13 is a schematic of the port's DMA address and control registers;

FIG. 14 is a schematic of the circuitry within the port for driving the ready bus;

FIG. 15 is a schematic of the circuitry within the port for driving the select line;

FIG. 16 is a schematic of the port's status register;

FIG. 17 is a schematic of the circuitry within the port for driving the error line;

FIG. 18 is a schematic of the circuitry within the port for decoding the mask;

FIG. 19 is a schematic of the port's end status register;

FIG. 20 is a schematic of the port's wrap registers;

FIG. 21 is a schematic of the port's side control register;

FIG. 22 is a schematic of circuitry withing the port for initiating extended mode operation;

FIG. 23 is a schematic of maintenance control circuitry that is shared between the two ports in a controller front end;

FIG. 24 is a block diagram of the SBA;

FIGS. 25A and 25B are timing diagrams illustrating the sequence of signals between the SBA and the IOCP's ALU;

FIG. 26 is a schematic of clock distribution circuitry in the SBA;

FIG. 27 is a timing diagram of clock signals in the SBA;

FIG. 28 is a schematic of clock driving circuitry within an SBA sub-bus interface;

FIG. 29 is a schematic of data and tag output circuitry within the SBA sub-bus interface;

FIG. 30 is a schematic of input circuitry within the SBA sub-bus interface; and

FIG. 31 is a schematic of circuitry within the SBA sub-bus interface for sensing the select line.

DESCRIPTION OF THE PREFERRED EMBODIMENT

Overview

FIG. 1 is a block diagram of a representative computer system on which the present invention may be implemented. Broadly, the computer system comprises a central processing unit (CPU) 10, a service processor (SVP) 12, a memory controller (MC) 13, and an I/O channel processor (IOCP) 15, all of which communicate on a system bus 17 with bus arbitration being carried out by a bus control unit (BCU) 18. CPU 10 includes a cache/TLB (translation look-aside buffer) and an arithmetic logical unit (ALU), and further communicates with a floating point accelerator (FPA). Service processor 12 is used for initialization and reconfiguration of the computer system. Memory controller 13 communicates with memory units. IOCP 15 includes a cache/TLB 20, an ALU 22, and a sub-bus adaptor (SBA) 23.

SBA 23 is coupled to two I/O sub-buses 25 and 27, and communicates via one or both of the sub-buses with a plurality of peripherals, 30a and 30b being shown. The peripherals are spatially distributed over a significant area so that sub-buses 25 and 27 are relatively long (perhaps 50' or 100'), extending to respective terminator units 31 and 32. Each peripheral includes a device 33 (which may be a tape drive, a disk drive, or the like), an appropriate device controller 34, and a controller front end (sometimes called a "CFE") 35 which communicates with controller 34 via a set of data and control lines 36.

In the preferred embodiment, controller front end 35 has two ports 37 (sometimes referred to as the A and B ports) which couple to respective sub-buses. In the case of peripheral 30a, ports 37 are coupled to sub-buses 25 and 27, but this is not necessary. To illustrate this, peripheral 30b is shown as having one of its ports coupled to sub-bus 25 and the other coupled to a sub-bus 27' from another IOCP (not shown). In the preferred embodiment up to sixteen ports may be coupled to a given sub-bus. Each port is provided with switches to allow the unit number to be defined.

FIG. 2A is a block diagram illustrating the major components and communication paths within controller front end 35. Only one port is shown. As can be seen, each port includes clock receiving circuitry, data handling circuitry, control circuitry, and a variety of registers. Controller front end 35 also includes control circuitry common to both ports. The controller front ends are implemented in TTL logic; the particular structure and operation of the various components will be described in detail below with reference to various circuit schematics. The circuit schematics are drawn in a somewhat simplified format. Part numbers are shown in an abbreviated notation with an apostrophe signifying the omission of the family designator "74S." Also, multiple parallel devices are shown as single devices.

While the nature of an individual device controller 34 will depend on the nature of the device or devices with which it communicates, the controller front end 35 is the same for all peripherals. It is assumed that controller 34 includes sufficient intelligence and appropriate interface circuitry to communicate on lines 36.

The present invention relates to the manner in which information transfers on sub-buses 25 and 27 are timed. For the purposes of the following discussion, sub-buses 25 and 27 may be considered substantially the same, and further, the two ports within a given controller front end 35 may be considered the same. Accordingly, much of the discussion that follows will be in terms of a single sub-bus and a single port within controller front end 35. Moreover, a given sub-bus will usually be referred to simply as a "bus" except when required to distinguish it from system bus 17.

FIG. 2B is a schematic illustrating the signal paths on which data, control signals, and timing signals are communicated between SBA 23 and controller front end 35. To simplify the explanation, only sub-bus 25 ("bus 25") and one port 37 are shown.

Bus 25 includes a data bus 40, a ready bus 41, a tag bus 42, a select line 43, an interrupt line 44, a first clock line 45 (TCLK), a second clock line 47 (RCLK), a first frame line 50 (TFRM), a second frame line 52 (RFRM), and an error line 53. All the signals on bus 25 (except select) are driven and received by 26S10 open collector quad bus transceivers.

Data bus 40 includes lines for sixteen data bits and two parity bits. The parity bits are used to maintain an odd number of bits in each of two groups of eight data bits. In general, the parity of the data bus will be correct, although there are some conditions in which the parity cannot be properly controlled, such as during the poll activity data response cycle to be discussed below.

Ready bus 41 includes four lines which correspond to four logical transfer channels. A device operating in the block transfer mode may be attached to any one of the four transfer channels. When an attached device is ready to transfer a 4-word burst on four consecutive cycles, it activates the appropriate ready line. The IOCP responds to the request by issuing an appropriate tag to grant that transfer channel four consecutive bus cycles sufficient for the burst. A device that is capable of moving data faster than the bus rate need not use ready bus 41, but rather may be assumed by the IOCP to be ready.

Tag bus 42 includes four tag lines, two I/O status (IOS) lines, and a parity line, and is used to define bus operations. The tag field is used primarily to define the next bus cycle, but also has extended uses as defined by the IOS bits.

Select line 43 is controlled by any unit which is involved with a bus cycle, and thus provides an indication whether no units, one unit, or more than one unit has been selected.

Interrupt line 44 may be driven by any device that both has its activity bit set and is allowed to interrupt based on a previously distributed mask. The interrupt line is not used for data transfer (that is the function of ready bus 41), but rather is used to initiate a communication, that is, to start a transfer. The state of the line tells the IOCP that some device needs service. The IOCP uses the poll activity tag to determine which device.

Error line 53 is driven by any device at any time to inform the IOCP that something is broken. Whenever a controller detects a hardware failure that would inhibit it from proper functioning, it asserts the error line and provides error information in its own status register. In response to the error signal, the IOCP can determine which device on the bus has a problem by reading each device's status register.

Data bus 40 is bi-directional in that it may be driven either by SBA 23 or by port 37. Tag bus 42, on the other hand, is only driven by SBA 23. Ready bus 41, select line 43, interrupt line 44, and error line 53 are driven by the ports. The above lines are resistively terminated at terminator unit 31.

TCLK line 45 and TFRM line 50 are driven by SBA 23 and extend to terminator unit 31 where they are resistively terminated.

RCLK line 47 comprises a pair of segments 47(out) and 47(in) which are connected at terminator unit 31. The RCLK signal is driven by SBA 23 on segment 47(out), propagates away from the SBA toward terminator unit 31 where it is turned around and propagates back toward SBA 23 along segment 47(in). Segment 47(in) is resistively terminated at SBA 23. Port 37 is coupled to RCLK segment 47(in), but not segment 47(out).

RFRM line 52 similarly comprises a pair of segments 52(out) and 52(in) which are connected at terminator unit 31 with port 37 being coupled to RFRM segment 52(in).

The particular communication protocol is chosen with reference to considerations not necessarily pertinent to the present invention. However, a representative pipe-lined control sequence will be described briefly in order that the manner in which the various clock and frame signals are used may be understood. In the normal mode of operation, the state of tag bus 42 is interpreted by the controller front ends as defining what is to occur on the following bus cycle. Appropriate control logic (not shown) makes a determination as to whether that particular device is to send or receive data on the following cycle, and generates control signals to that effect.

Data transfers on the bus occur in a series of 4-word units or bursts, each of which occupies the bus for four successive bus cycles. There is no intrinsic significance to this number except that the sub-bus handles 16-bit words while system bus 17 handles 64-bit words. While other bus operations (most notably register transfers) are of other durations, the remaining discussion will deal primarily with data transfers.

Basic Timing and CFE Clock Receiving Circuitry

FIG. 3 is a timing diagram of the TFRM, TCLK, RFRM, and RCLK signals as generated at SBA 23. In the preferred embodiment, the sub-bus cycle is 250 ns (by way of comparison, system bus 17 operates with a 25-ns cycle).

TCLK is a continuous stream of pulses with leading edges at 250 ns intervals to define the bus cycles and time transfers from the IOCP to the device. The TCLK pulses are 100 ns in duration. For definiteness consider a data transfer that is to occur having the cycles designated N, N+1, N+2, and N+3. TFRM is asserted for 100 ns substantially coincident with the TCLK pulse of the bus cycle (N−1) immediately preceding the first cycle of the 4-cycle transfer. TFRM is not asserted again (to signify a new bus operation) until RFRM has cleared the bus. TCLK runs continuously to time transfers from the IOCP to the device.

SBA 23 places data on the bus at a leading edge of TCLK while the port logic latches the data on the bus at the trailing edge of TCLK (points A, B, C, D). The SBA keeps the data on the bus for a length of time that extends some interval (say 50 ns) beyond the 100 ns TCLK pulse width.

RCLK runs continuously at the same rate as TCLK to time transfers from the device to the IOCP. The leading edge of the RCLK pulses lags the trailing edge of the TCLK pulses by a 100-ns interval. RFRM is asserted for 100 ns substantially coincident with the next RCLK pulse following the assertion of TFRM. The relative timing between (TCLK, TFRM) and (RCLK, RFRM) differs for devices distributed along the bus, since the TFRM and TCLK signals are communicated to the devices directly while the RFRM and RCLK signals must be turned around at terminator unit 31. More particularly, the relative timing is substantially as shown for a device that is located near the terminator unit but the relative delay increases for a device that is located between the IOCP and the terminator. The lag of 100 ns (or more) between the trailing edge of TCLK and the leading edge of RCLK is needed to allow the device most remote from the IOCP enough time to ascertain that it is to place data on the bus and generate the appropriate control signals. The port logic places the first data word on the bus at the leading edge of the RFRM (point A') and removes the last data word slightly after the trailing edge of the 4th RCLK (point B'). SBA 23 latches the data at the trailing edge of RCLK (points A", B", C", and D").

The timing of a register transfer is roughly analogous to that of a data transfer, except that it only occupies data bus 40 for two bus cycles, say cycles N and N+1. Cycle N−1 is the tag cycle which signifies that the following two cycles are to be dedicated to a bus operation. Cycle N is the ID cycle during which the unit number, the register number, and the direction of the register transfer are placed on the data bus. Cycle N+1 is the cycle during which the data is read from or written into the register previously identified.

The significance of the TCLK, TFRM, RCLK, and RFRM signals may now be understood and discussed with reference to a number of hypothetical configurations. As discussed in the introducing portion of this specification, a single clock signal, corresponding to TCLK, would suffice for timing data movements in both directions on data bus 40, were it not for the fact that bus 25 is physically long so that signal propagation times are comparable to or greater than the bus cycle time. Consider a simple case where the device clocks data into its buffers at a predetermined point in a first clock cycle, and places response data onto the bus at another predetermined point in the following bus cycle. The IOCP expects to latch this response data at a predetermined time in that following bus cycle. However, where the bus is physically long, the IOCP may see that following bus cycle before the response data has propagated back to the IOCP. The RCLK signal overcomes part of this problem since each device latches the bus data at a predetermined time relative to TCLK (trailing edge), and places its response data on the bus at a predetermined time relative to RCLK (leading edge).

Propagation delays can still result in cycle identification confusion. Consider a situation when more than one clock signal is propagating on both the RCLK and TCLK lines. For a device at the far end of the bus (near terminator unit 31), TCLK and RCLK are in almost the same phase relationship as they are at the IOCP. They are simply delayed by the one-way propagation time along the bus, and there is no confusion. However, for devices closer to the IOCP, TCLK appears earlier and RCLK appears later (since RCLK has to make the round trip). This relative lateness of RCLK does not become a serious problem until RCLK and TCLK have become skewed by more than a cycle. Then, the RCLK that follows TCLK is actually the RCLK of the previous cycle which is still travelling along the inbound RCLK line. This problem may be overcome with by slowing down the clocks or by incorporating a mechanism wherein each device takes into account its position on the bus. Neither alternative is desirable.

The TFRM and RFRM signals solve the cycle misidentification problem in a manner that avoids the above undesirable alternatives. As discussed above, the TFRM and RFRM signals provide variable frame cycles controlled in such fashion as to prevent more than one frame being on the bus at any one time. At the same time, the fixed clock cycles are used to move the data. This system is fully synchronous in nature, with all timing and reference elements being originated by and therefore referenced to the IOCP master clock. This helps to prevent any metastable data state caused by data changing at a time when it is being sampled or evaluated.

FIG. 4 is a circuit schematic of clock receiver circuitry 58 within port 37. TCLK, TFRM, RCLK, and RFRM are communicated to respective receivers 60. The outputs of the TCLK, RCLK, and RFRM receivers are communicated through inverting and non-inverting buffers 62 to provide positive and negative local signals, designated ±TC, ±RC, and ±RF. The outputs of the TFRM and TCLK receivers are communicated to AND and NAND gates 63 to provide local signals ±TF that are more precisely synchronized with the ±TC signals. The TCLK receiver output is also passed through a delay circuit 65 to produce a delayed local clock signal −TCD. The −TF signal is gated with −TCD to provide delayed local frame signals ±TFD. FIG. 5 is a timing diagram for the above described local timing signals. Only the positive signal is shown if both positive and negative signals are provided.

CFE—Data Handling Circuitry

FIGS. 6A and 6B, taken together, provide a logical schematic of the data handling circuitry within port 37. This circuitry includes input circuitry 80, input data staging circuitry 82, output data staging circuitry 85, and output circuitry 87. It should be noted that the references to "input" and "output" are opposite to the general convention that directions are denoted relative to the IOCP. As will be described more fully below, for data transfers, the tag decoding circuitry generates signals −XW and −XR, signifying a write to or a read from the device.

Data staging is required since data transfers occur in 4-word bursts that occupy 4-cycle intervals. Therefore, transfers from the IOCP to the device are only allowed to occur when input staging circuitry 82 is prepared to receive four words into its registers. Similarly, transfers from the device to the IOCP are only allowed to occur when output staging circuitry 85 has four words in its registers and is prepared to transfer these words onto the bus on successive bus cycles. The staging circuitry communicates with controller 34 via communication lines 36 which include data lines 90 (XDATA), address lines 92, load and unload lines 93, and parity lines 95. Lines that are shared with the other port are marked with an asterisk.

Data input circuitry 80 includes receivers 100, latches 102, and parity checking circuitry 103. Latches 102 are controlled by the +TC signal to place the data on internal data lines 105, designated LDIN. Latches 102 are transparent until the trailing edge of +TC, at which point LDIN lines 105 are held for the duration of the cycle. The transparency allows the incoming data to be communicated to control circuits for the register operation (to be described below) which are thereby afforded additional time to decode the data.

Input staging circuitry 82 includes an array of 4-by-4 register files 110, the data inputs of which are coupled to LDIN lines 105, and the data outputs of which are coupled to XDATA lines 90.

The loading of register files 110 is controlled and timed by signals derived from TCLK and TFRM. The control circuitry includes a counter 115, the output of which controls the register file input address. The data on LDIN are latched into the register files at the trailing edge of +TC and the counter is incremented at the trailing edge of −TCD. The resetting and incrementing of counter 115 are controlled by flip-flops 117 and 118, the first of which has the control signal −XW as generated by the tag decoding circuitry at its data input and is clocked by the trailing edge of −TFD. In this manner, TFRM (actually −TFD) in combination with the appropriate tag validates the loading of register files 110 while TCLK times the loading. The transfer of data out of register files 110 to the controller is under the control of the controller and occurs in whatever sequence at whatever rate is appropriate for that controller. To this end, one of lines 93 controls the output enable of the register files 110 while address lines 92 control the output address.

Output data staging circuitry 85 includes an array of 4-by-4 register files 120, the data inputs of which are coupled to XDATA lines 90, and the data outputs of which are coupled to lines 122, designated DOUT and POUT.

The transfer of data from the controller into register files 120 is under the control of the controller by means of lines 92 and 93 in analogy to the transfer from register files 110 to the controller.

The output addressing of register files 120 is controlled and timed by signals derived from RCLK and RFRM. The control circuitry includes a counter 125 which is incremented at the trailing edge of +RC. The resetting of counter 125 is controlled by a flip-flop 127 which has the control signal −XR at its data input and is clocked by the leading edge of +RF. A flip-flop 128 with the same clock and data inputs generates a +HOLD signal which is asserted by the leading edge of RF and removed when counter 125 has counted four cycles.

The output on lines 122 is communicated to output circuitry 87 (shown in FIG. 6B) which includes output latches 130 and bus drivers 132. A set of output data lines 133 (designated RDATA) communicates the output data to latches 130. A number of control registers, designated collectively 134, are also coupled to RDATA lines 133. These registers will be described below. The control and timing of the output is somewhat more complicated than the straightforward case of input latches 102. More particularly, latches 130 remain transparent during the transfer (+HOLD asserted). Bus drivers 132 are gated by a signal controlled by flip-flops 135 and 137. Flip-flop 135 is set at the leading edge of +RF, and keeps drivers 132 enabled during the 4-cycle transfer. The +HOLD signal keeps flip-flop 137 reset, but when +HOLD is removed, flip-flop 137 can then be set at the next −RC trailing edge, which closes the gate to the drivers. Thus, the last data word is removed from the bus at the trailing edge of +RC (actually later by some gate delays). Thus, the data at SBA 23 is valid at the trailing edge of RCLK which is slightly earlier.

Tags

As briefly alluded to above, the state of tag bus 42 is used to define the bus activity that is to occur over the next cycle or group of cycles. The tag definitions and control signal mnemonics for the various hexadecimal states of the tag bus are tabulated below.

| Hex Code | Tag Definition | Control Signal |
|---|---|---|
| 0 | no operation | |
| 1 | set mask | -SM |
| 2 | activity poll | -POLL |

-continued

| Hex Code | Tag Definition | Control Signal |
|---|---|---|
| 3 | register operation | -REGOP |
| 4 | lock | -LOCK |
| 5-B | unassigned | |
| C-F | data transfer | -XR, -XW |

The IOS bits are used to further define how the tag bits are to be used by the controller. In the normal mode of operation, both IOS bits are zero (a high level on the actual bus lines), in which case the tag field is interpreted normally according to the table set forth above. The IOS lines provide two extensions where the tag field carries the unit address of the peripheral controller to be affected. One extended mode is used to write into the shared unit control register of the controller front end while the other extended mode is used for enabling the receivers and inhibiting the drivers (that is, "evicting" a port from the sub-bus). Unlike normal operations where the tag defines the activity that is to occur on the following cycle(s), the tag field in the extended modes describes activity that is to happen during the present bus cycle.

FIG. 7 is a schematic of circuitry 150 for decoding the tag and IOS signals present on tag bus 42. The circuitry includes receivers 152, parity checking circuitry 155, and the decoding circuitry proper. A comparator 157 and a decoder 160 decode the tag information during the normal mode, and the results are communicated to flip-flops 165. Flip-flops 165 are clocked on the trailing edge of −TF to provide the control signals tabulated above. This illustrates the manner in which the TFRM signal is used to validate the tag signal. A comparator 166 provides a control signal +OSO indicating that the IOS lines specify an extended mode for the particular unit.

Register Operations

A register operation (tag=3) provides for transfer of control information on the data bus into or out of one of the port's registers. A register operation occupies the two bus cycles immediately following the cycle in which the tag is issued. These cycles are designated the definition cycle and the register transfer cycle. The data bus carries a unit identification field for the port, a register identification field for the relevant register, and a direction flag during the definition cycle. The data bus carries the register data during the register transfer cycle.

FIG. 8 is a schematic of circuitry that decodes the information that is placed on the bus during the definition cycle to determine the particular register operation that is to be carried out. The circuitry is operable to cause the registers tabulated below to be read from the port onto the bus. Also tabulated are the mnemonics of corresponding control signals generated by the circuitry.

| Register | Control Signal |
|---|---|
| wrap other | -RDWRAP.THEM |
| wrap self | -RDWRAP.US |
| type | -RDTYPE |
| pointer | -RDPTR |
| status | -RDERR |

The circuitry of FIG. 8 is also operable to cause the following registers to be loaded from the bus.

| Register | Control Signal |
|---|---|
| DMA address and control | -XLDLO/-XLDHI |
| attention | -WATTN |
| end status | -WESTAT |
| side control | -WCTL |

During the definition cycle, all devices on the bus scan the data lines to determine which device is the subject of the register operation. A comparator 170 compares the 4-bit unit identification field of the data bus with the 4-bit UNIT code from the switches. A gating network 172 senses the direction flag on the data bus to determine whether a register is to be read from the IOCP or written into by the IOCP during the following (register data) cycle. Respective decoders 175 and 180 sense the register identification field on the data bus to generate the appropriate control signals for register reads and writes.

The timing of the register operation control signals requires some explanation. First, it should be noted that TFRM is asserted twice during a register operation, namely during the tag cycle and again during the definition cycle. A signal from gating network 172 specifying a register read is clocked on the trailing edge of −TF during the definition cycle to generate a signal −RGR that remains active until the next trailing edge of −TF (that is, until the next bus operation). The particular register read control signal remain asserted for a similar interval.

The timing for the register write control signals is more complicated. A signal −RGW is asserted at the trailing edge of −TF, and is clocked through to a gate 182 on the next leading edge of +TC which is the start of the register transfer cycle. Gate 182 is also controlled by −TCD, so that the gate output goes high at the leading edge of −TCD (50 ns later). This allows a flip-flop 185 to sample the data parity error signal +DPE and clock a low level to enable decoder 180 on the next trailing edge of −TC. The particular register write control signal is then asserted, until −TCD is removed 50 ns later. FIG. 9 shows the timing for these control signals.

Logical Transfer Channels

FIGS. 10–21 and 31 are schematics of register circuitry for implementing the system of logical transfer channels described in our copending application, and will not be described further.

CFE—Maintenance Controls

FIG. 22 is a schematic of circuitry within each port for decoding the IOS lines and asserting signals −F1 and −F2 denoting special functions (extended mode). The IOS lines are communicated to a decoder 336 whose outputs provide the −F1 and −F2 signals. Operation in one of the extended modes (maintenance write for −F2 or "eviction" for −F1) occurs only under special conditions, with especially profound results. Accordingly, there is provided a special timed protocol for ensuring that neither −F1 nor −F2 will be asserted spuriously, as for example during power transitions. To this end, decoder 336 is not enabled until TFRM (actually the ungated signal +RAWTF) has been asserted for a predetermined number of cycles. A chain of counters 337 counts +TC pulses (at 250 ns intervals) and for 12 bits defines a 1-ms interval. The assertion of +RAWTF releases the counter clear (so long as +OSO is asserted) and the counter output is gated with +RAWTF to enable decoder 336 once +RAWTF has been active for 1 ms. A corresponding interval later, the counter output changes, thereby negating −F1 and −F2. The data, IOS, and tag must be valid at this transition for maintenance writes. A signal −THIS allows for selection to be described below.

FIG. 23 is a schematic of shared maintenance control circuitry 340. This circuitry responds to the extended mode signals −F1 and −F2 from both ports (designated −F1.A, −F2.A for port A and −F1.B, −F2.B for port B) in order to allow the IOCP to "evict" a port from one of the sub-buses or to carry out a maintenance operation. Circuitry 340 includes receiver control flip-flops 342a and 342b which provide respective pairs of signals ±IN.A and ±IN.B for controlling the receivers in the respective ports. The circuitry also includes driver control flip-flops 345a and 345b which provide respective pairs of signals ±OUT.A and ±OUT.B for controlling the drivers in the respective ports.

The assertion of −F2 (−F2.A or −F2.B) allows the IOCP to use either of the two data sub-buses to communicate maintenance instructions to control the setting of flip-flops 342a-b and 345a-b. The input data lines from both sub-busses are communicated to a first level of multiplexers 350 which provide for selection from one sub-bus or the other, and a second level of multiplexers 352 which allow the desired port to be affected. The need for two levels of multiplexing arises from the fact that while the IOCP will know which sub-bus the port to be controlled is on, it will not know which port within the controller front end is connected to that sub-bus. The multiplexer selection is effected by the signal −THIS from the A port (−THIS.A).

In a maintenance write, bits (0–2) control the input, bits (4–6) the output. Bits (8–F) are written into flip-flop 355 which defines a maintenance register that provides control signals for the controller itself. Bit (0) active specifies that the input function is to be affected. Bit (1) active specifies that the receiving port is to have its own input function affected, bit (2) active specifies that the other port is to have its input function affected. The output functions are handled analogously. The clocking of the flip-flops occurs when −F2 is withdrawn.

The assertion of −F1 (−F1.A or −F1.B) signifies that the port is to be evicted. This mode does not make use of the data bus and uses the −F1 signals to directly control the flip-flops. More particularly, the assertion of −F1 disables the drivers coupled to the sub-bus and forcibly enables the receivers.

IOCP—General Operation

The above description made no assumptions regarding IOCP 15 except that the IOCP had sufficient intelligence to determine that the above-described sequences of commands should be issued and that it had the means for driving and detecting signals on the sub-buses. As outlined above, IOCP 15 includes cache/TLB 20 and ALU 22 which together constitute a CPU capable of performing the supervisor and message-handling tasks that permit the peripherals coupled to the sub-buses to communicate with devices coupled to system bus 17. The design and implementation details of the IOCP's CPU represent matters outside the scope of the invention. It suffices to note that in the preferred implementation, the IOCP's CPU is a 64-bit ECL microprogrammed processor with a 50-ns cycle time.

SBA 23 relates more directly to the invention, and will now be described, albeit at a somewhat lower level of detail. SBA 23 is coupled to a 64-bit interface for communication with the IOCP's CPU. Broadly, SBA 23, when receiving a 64-bit word from the IOCP's CPU, breaks that down into 16-bit data and accompanying control information for transmission onto the sub-bus. When receiving 16-bit data from the sub-bus, the SBA assembles the 16-bit data into 64-bit words and signals the ALU to retrieve the data.

FIG. 24 is a block diagram of SBA 23. SBA 23 couples to sub-buses 25 and 27 through respective sub-bus interfaces 350 and 352, receives 64-bit words (72 bits with parity) from the ALU at an input latch 355, and transmits 64-bit words (72 bits with parity) at an output latch and multiplexer 357. The SBA includes a local store 360 and a control store 362, both of which may be downloaded with information from the ALU.

Local store 360 contains a two-word data buffer for each of the eight transfer channels capable of being supported by the SBA (four on each of the two sub-buses), pointers, channel status words, and a table to provide a priority regime for servicing the transfer channels on each of the two sub-buses. The reason for there being two words dedicated to each transfer channel is that the byte alignment from the sub-bus need not correspond to what the ALU requires.

Associated with sub-bus interfaces 350 and 352 are respective sequencers 370 and 372 and respective control store data registers 375 and 377. The basic function of the sequencers is to transfer the appropriate two bytes from local store 360 to the respective sub-bus interface, or to transfer two bytes from the sub-bus interface to the appropriate location in local store. Sequencers 370 and 372 handle a limited number of commands as specified by the ALU, and relieve the ALU of any tasks associated with timing data movement to and from the sub-buses.

The bits in a word from control store 362 provide the necessary control signals for the operation of the sequencers and the sub-bus interfaces. Control store data registers 375 and 377 are loaded from control store 362 to provide such control signals. Local store 360 and control store 362 are each time sliced on a 50-50 basis with the two sequencers running out of phase with one another. Sequencer 370 and sub-bus interface 350 are referred to as the "A side"; sequencer 372 and sub-bus interface 352 as the "B side." These designations need not correspond to the A and B ports in the controller front ends.

The SBA further includes an 8-deep channel FIFO stack 380 into which are written the transfer channel numbers in the order that they are serviced. With the exception of portions of sub-bus interfaces 350 and 352, the SBA is implemented in ECL logic due to the relatively high speed required.

The data flow and general operation of the SBA may be understood by considering, first, the sequence for a transfer from the ALU onto the sub-bus (as for example to effect a write from memory to disk), and second, the sequence for a transfer from the sub-bus to the ALU (as for example to effect a read from disk to memory).

When the ALU decides to begin a transfer, it communicates to the SBA the direction, the transfer channel address, and a byte offset. The ALU latches a first 64-bit word from its cache and makes this available at input latch 355. The ALU provides the channel address and an opcode specifying that the first word is to be written to a peripheral controller.

The SBA stores this first word in the first of the two locations in local store 360 dedicated to this transfer channel, puts the channel address in channel FIFO 380, and asserts a transfer channel ready flag to the ALU. (Note at this time the first word has not been transferred onto the sub-bus.)

The ALU, on seeing the transfer channel ready flag, reads the channel address, and uses this channel address to index a channel control word which specifies, among other things, the amount of data left to transfer. The ALU fetches the next word from its cache, makes it available at latch 355, and provides the SBA with the channel address and an opcode specifying a write to a peripheral controller.

The SBA stores the second word in the second of the two local store locations dedicated to that transfer channel. The SBA causes eight bytes to be transferred on the sub-bus on four successive sub-bus cycles according to the sequence and timing described above. Depending on the byte offset, the eight bytes may come in part or in whole from the first of the two local store locations. After the eight bytes have been transferred, the SBA puts the channel address in channel FIFO 380, and asserts the transfer channel ready flag.

As above, the ALU upon seeing the transfer ready flag, reads the channel address, indexes the channel control word, fetches the next word from its cache, and communicates this word with accompanying control information to the SBA. The SBA stores this next word in the first local store location and transfers eight bytes as described above. On successive transfers, it will store words from the ALU alternating between the first and second locations.

For a transfer from the peripheral to the IOCP, the ALU initiates such a transfer by informing the SBA of the direction, the transfer channel address, the byte offset, and provides the SBA with a transfer channel address and an opcode specifying a read from peripheral controller.

The SBA causes eight bytes to be transferred from the controller on the sub-bus over four successive sub-bus cycles, stores the eight bytes in the first local store location, puts the channel address in the channel FIFO, and asserts the transfer channel ready flag.

The ALU, upon seeing the transfer channel ready flag, reads the channel address, indexes the channel control word, and gives the SBA the transfer channel address and the opcode specifying a read from peripheral controller.

The SBA then effects a transfer of eight more bytes and stores them in the second location in local store 360, puts the channel address in channel FIFO 380, and asserts the transfer channel ready flag.

Upon seeing the channel address at the head of the FIFO, the SBA reads the appropriate eight bytes out of the two locations for that channel, and transfers these eight bytes to output multiplexer 357. The ALU reads the channel address, uses it to index the channel control word, reads the word from output latch 357 and provides it to its cache. The ALU then gives the SBA the transfer channel address and the opcode specifying a read from controller to repeat the above sequence. The SBA alternately stores the eight bytes from the sub-bus in the first and second locations as in the case of the transfer from the IOCP to the controller.

FIGS. 25A and 25B are timing diagrams for control signals passing between the ALU and the SBA, illustrating the sequence of events for the two directions of transfers outlined above. The gaps illustrated in the sequences signify that the 64-bit data transfer on the sub-bus occurs within the interval.

IOCP—Clock Generation

FIG. 26 is a schematic of circuitry within SBA 23 that provides various clock signals for sequencers 370 and 372 and for sub-bus interfaces 350 and 352. The circuitry operates to provide a variety of 50-ns and 250-ns clock signals that establish sub-bus timing. These are derived from the basic 25-ns clock signal that defines overall system timing.

Complementary system clock signals +SYSCLK and −SYSCLK are gated at a network 400 to produce complementary 25-ns clock signals +GCLK and −GCLK. +GCLK is communicated to a counter 402 which provides frequency divided signals, more particularly a 250-ns clock signal +REF0, and a 50-ns clock signal +(A/B). These signals are communicated to two sets of circuitry corresponding to the A and B sides of the SBA. Only one set will be described. The suffix "0.A" will denote timing signals for the A side; the suffix "0.B" will denote signals for the B side.

REF0 is communicated to a chain of cascaded flip-flop stages 405 which, when clocked by a signal derived from −GCLK, provides a group 407 of 250-ns clock signals. Signals 407 include four subgroups: (+T01.A, +T02.A, +T03.A), +R1.A, (+T21.A, +T22.A, +T23.A), and +R3.A. The subgroups are progressively delayed relative to one another by 25-ns increments. A timing diagram of signal group 407 is shown in FIG. 27.

The 50-ns signal +(A/B) is inverted to define a signal −(A/B).A which is clocked by the same derived −GCLK signal to generate a group 408 of 50-ns clock signals +T(A/B)1.A, −T(A/B)1.A, +T(A/B)3.A. The signal +(A/B) in its non-inverted state is used to establish a complementary set of signals (not shown) for the B side.

FIG. 28 is a schematic of circuitry within sub-bus interface 350 for generating the outbound clock signals, the timing of which is illustrated in FIG. 3. The 250-ns signal +R3 is communicated to the data inputs of flip-flops 430 and 431 which are clocked at 50-ns intervals by +T(A/B)1. The outputs of flip-flops 430 and 431 are passed through ECL/TTL converters 432 and to respective bus drivers 435 and 437 to drive TCLK line 45 and TFRM line 50. As discussed above, TCLK runs continuously while TFRM is only asserted in connection with the issuance of tags. TFRM is controlled by the signal +ETF (enable TFRM) which is one of the bits from control store data register 375. This is effected by having +ETF, as clocked through a flip-flop 438, control the reset input of flip-flop 431.

In a like manner, the 250-ns signal +R1 is communicated to the data inputs of flip-flops 440 and 431, the outputs of which are passed through ECL/TTL converters 432 and to respective bus drivers 445 and 447 to drive outbound RCLK line segment 47(out) and outbound RFRM line segment 52(out). RFRM is controlled by the signal +ERF (enable RFRM), as clocked through flip-flops 448 and 449. The extra flip-flop (relative to +ETF) provides a 250-ns delay, so that while +R1 leads +R3 by 50 ns, RFRM lags TFRM by 200 ns.

IOCP—Data Movement

FIG. 29 is a schematic of circuitry within the sub-bus interface for driving data bus 40 and tag bus 42. The four tag bits are passed through ECL/TTL converters 460 and through flip-flops 462 while the IOS bits are just passed through converters 460. The IOS and tag bits are communicated to a parity generator 467, and the resultant seven bits are communicated to bus drivers 468 for driving tag bus 42.

The data bits are communicated through ECL/TTL converters 460 and through two flip-flop stages 472 and 475 to bus drivers 477. Flip-flop stage 472 provides a 250-ns delay relative to the tag bits. Flip-flops 472 and 475 (as well as flip-flops 462) are clocked by the leading edge of +T03.

The output enable of data bus drivers 477 is controlled, in the first instance, by +EDATA (enable data), which is one of the control store data register bits. +EDATA is clocked through two flip-flop stages 480 and 482 to establish the same timing as the data. +T23 and +T01 are combined at a gating network 485. The complement of the output from network 485 is shown on FIG. 28, designated "output enable." This signal is further delayed somewhat by additional gating stages, but, when gated by the clocked +EDATA at a gate 487, defines the basic output timing for the sub-bus interface. That is, the output drivers are enabled over a major portion of the 250-ns cycle, starting generally near the leading edge of TCLK (+R3) and extending beyond the trailing edge of TCLK. Thus, the data is valid when latched by the ports' input latches 102 at the trailing edge of TCLK.

FIG. 30 is a schematic of circuitry within the sub-bus interface for receiving signals on data bus 40, ready bus 41, interrupt line 44, and error line 53. These signals, as well as the RCLK signal on RCLK line segment 47(in) are communicated through bus receivers 500, to latches 502, and are latched at the trailing edge of RCLK(in). The latch outputs are communicated to flip-flops 505 which are clocked by a TTL signal +TT2 signal derived from +T22, passed through TTL/ECL converters 507 to be made available to the SBA.

It will be appreciated that the incoming data will not be valid until a certain time interval after the tag specifying that there will be incoming data to be read is issued. To this end, the SBA asserts a signal +RECV (one of the bits in the control store data register) when there is to be incoming data associated with this operation. +RECV is clocked at a flip-flop 515, and then through a set of cascaded flip-flop stages 517, the number of such stages being adjustable according to the length of the sub-bus. The dependence on the sub-bus length arises since the incoming data is timed relative to RFRM and RCLK which must turn around at the sub-bus terminator. The output from cascaded flip-flops 517 is clocked at a flip-flop 520 by the signal +T21 to generate a signal DATA VALID once RFRM has turned around.

In summary it may be seen that the present invention provides a clock system that permits synchronous operation of the data bus in both directions without requiring that the bus length be restricted or that the bus cycle be increased to avoid ambiguous data states. While the above is a complete disclosure of the preferred embodiment and discloses the implementation in the context of a preferred system, various modifications, alternate constructions, and equivalents may be employed without departing from the true spirit and scope of the invention. For example, the invention is not restricted to use in a computer I/O channel, and may be used wherever it is required to move digital data. Moreover, the particular pipelined control sequence has the advantage of effective utilization of bus resource, but the direct and turned around clock and frame signals are useful in other systems. Depending on the protocol, the frame signals might be defined differently. Therefore, the above description and illustrations should not be taken as limiting the scope of the invention which is defined by the appended claims.

We claim:

1. In a data communication system wherein a channel processor may communicate with a plurality of devices coupled in parallel at sequential points along a data bus, an improved clock system comprising:
   a first clock line originating at said channel processor and extending to a termination point beyond the last of said devices;
   means for coupling said devices to said first clock line in the same sequence as that in which said devices are coupled to said data bus;
   a second clock line having a first segment originating at said channel processor and extending to a turn-around point, and a second segment extending from said turn-around point toward said channel processor;
   means for coupling said devices to said second segment in the reverse sequence to that in which said devices are coupled to said data bus; and
   means associated with channel processor for driving said first clock line and said first segment of said second clock line at a common predetermined frequency to produce respective first and second clock signals, said first clock signal propagating along said first clock line away from said channel processor while being controlled by said channel processor, said second clock signal propagating along said second segment of said second clock line toward said channel processor while being controlled by said channel processor.

2. The invention of claim 1 wherein each of said devices has associated therewith:
   data input means responsive to and synchronized with respect to said first clock signal for reading data from said data bus; and
   data output means responsive to and synchronized with respect to said second clock signal for placing data onto said data bus.

3. The invention of claim 1 wherein said channel processor has associated therewith:
   data output means synchronized with respect to said first clock signal for placing data onto said data bus; and
   data input means coupled to said second segment of said second clock line and responsive to and synchronized with respect to said second clock signal for reading data from said data bus.

4. In a data communication system wherein a channel processor may communicate with a plurality of devices coupled in parallel at sequential points along a data bus, an improved clock system comprising:
   a first clock line and a first frame line, each originating at said channel processor and extending to a termination point beyond the last of said devices;
   means for coupling said devices to each of said first clock and frame lines in the same sequence as that in which said devices are coupled to said data bus;
   a second clock line and a second frame line, each having a first segment originating at said channel processor and extending to a turnaround point and a second segment extending from said turnaround point toward said channel processor;
   means for coupling said devices to said second segments of each of said second clock and frame lines in the reverse sequence to that in which said devices are coupled to said data bus;
   means associated with said channel processor for driving said first clock line and said first segment of said second clock line at a common predetermined frequency to produce respective first and second clock signals, said first clock signal propagating along said first clock line away from said channel processor while being controlled by said channel processor, said second clock signal propagating along said second segment of said second clock line toward said channel processor while being controlled by said channel processor;
   means associated with said channel processor for generating a first frame signal on said first frame line to signify the start of a new bus operation and allow any of said devices to validate its taking data off said data bus; and
   means associated with said channel processor for generating a second frame signal on said second frame line to allow any of said devices to validate its placing data on said data bus.

5. The invention of claim 4 wherein each of said devices has associated therewith:
   data input means responsive to said first clock signal and said first frame signal for reading data from said data bus synchronously with respect to said first clock signal subject to validation by said first frame signal; and
   data output means responsive to said second clock signal and said second frame signal for placing data onto said data bus synchronously with respect to said second clock signal subject to validation by said second frame signal.

6. The invention of claim 4 wherein said channel processor has associated therewith:
   data output means synchronized with respect to said first clock signal for placing data onto said data bus; and
   data input means coupled to said second segment of said second clock line and responsive to and synchronized with respect to said second clock signal for reading data from said data bus.

7. The invention of claim 6 wherein said channel processor further has associated therewith:
   data validation means for providing a data validation signal at an interval following the generation of said first frame signal, said interval being sufficient to allow said second frame signal to propagate along said first and second segments of said second frame line, whereupon the data read by said data input means may be uniquely identified with a given bus operation.

8. The invention of claim 7 wherein said data validation means comprises a plurality of cascaded flip-flop stages clocked at the frequency of said first and second clock signals.

9. For use with a peripheral device having a controller front end, an improved port comprising:
   a set of data terminals;
   a first clock input terminal adapted to receive a first clock signal;
   a first frame input terminal adapted to receive a first frame signal;
   a second clock input terminal adapted to receive a second clock signal distinct from said first clock signal;
   a second frame input terminal adapted to receive a second frame signal distinct from said first frame signal;
   means for storing data presented at said data terminals, said storing means being timed by said first clock signal received at said first clock input terminal and enabled by said first frame signal received at said first frame input terminal; and
   means for writing an item of data to said data terminals, said writing means being timed by said second clock signal received at said second clock input terminal and being enabled by said second frame signal received at said second frame input terminal.

10. The invention of claim 9 wherein said means for storing comprises:
   means defining a plurality of data locations; and
   sequencing means for transferring the data at said set of data terminals to sequential ones of said plurality of data locations in response to sequentially received clock pulses at said first clock input terminal.

11. A data communication system comprising:
   a channel processor;
   a plurality of peripheral devices, each of which includes data terminal means and first and second clock input terminal means;
   a first clock line originating at said channel processor and extending to a termination point;
   a second clock line having a first segment originating at said channel processor and extending to a turn-around point, and a second segment extending from said turn-around point to said channel processor;
   a data bus originating at said channel processor and extending to said termination point;
   means for coupling the respective data terminal means of said peripheral devices to said data bus at sequential points along said data bus;
   means for coupling the respective first clock input terminals to said first clock line so that the respective propagation times of signals travelling along said first clock line from said channel processor to the respective first clock input terminals correspond to the propagation times of signals travelling along said data bus from said channel processor to the respective data terminal means; and
   means for coupling the respective second clock input terminals to said second segment of said second clock line so that the respective propagation times of signals travelling along said second segment of said second clock line from the respective second clock input terminals to said channel processor correspond to the propagation times of signals travelling along said data bus from the respective data terminal means to said channel processor.

12. In a data communication system wherein a channel processor may communicate with a plurality of devices coupled in parallel at sequential points along a data bus, an improved data timing system comprising:
   a first clock line originating at said channel processor and extending to a termination point beyond the last of said devices;
   means for coupling said devices to said first clock line in the same sequence as that in which said devices are coupled to said data bus;
   a second clock line having a first segment originating at said channel processor and extending to a turn-around point, and a second segment extending from said turn-around point toward said channel processor;
   means for coupling said devices to said second segment in the reverse sequence to that in which said devices are coupled to said data bus;
   means associated with said channel processor for driving said first clock line and said first segment of said second clock line at a common predetermined frequency to produce respective first and second clock signals, said first clock signal propagating along said first clock line away from said channel processor while being controlled by said channel processor, said second clock signal propagating along said second segment of said second clock line toward said channel processor while being controlled by said channel processor;
   processor data output means associated with said channel processor synchronized with respect to said first clock signal for placing data onto said data bus;
   processor data input means associated with said channel processor, coupled to said second segment of said second clock line, being responsive to and synchronized with respect to said second clock signal for reading data from said data bus;
   device data input means associated with each of said devices, being responsive to and synchronized with respect to said first clock signal for reading data from said data bus; and
   device data output means associated with each of said devices, being responsive to and synchronized with respect to said second clock signal for placing data onto said data bus;
   whereupon data transfers from said channel processor to said devices are timed by said first clock signal while data transfers from said devices to said channel processor are timed by said second clock signal.

13. In a data communication system wherein a channel processor may communicate with a plurality of devices coupled in parallel at sequential points along a data bus, an improved data timing system comprising:
   a first clock line and a first frame line, each originating at said channel processor and extending to a termination point beyond the last of said devices;
   means for coupling said devices to each of said first clock and frame lines in the same sequence as that in which said devices are coupled to said data bus;
   a second clock line and a second frame line, each having a first segment originating at said channel processor and extending to a turnaround point, and a second segment extending from said turnaround point toward said channel processor;
   means for coupling said devices to said second segments of said second clock and frame lines in the reverse sequence to that in which said devices are coupled to said data bus;

means associated with said channel processor for driving said first clock line and said first segment of said second clock line at a common predetermined frequency to produce respective first and second clock signals, said first clock signal propagating along said first clock line away from said channel processor while being controlled by said channel processor, said second clock signal propagating along said second segment of said second clock line toward said channel processor while being controlled by said channel processor;

means associated with said channel processor for generating a first frame signal on said first frame line to signify the start of a new bus operation;

means associated with said channel processor for generating a second frame signal on said second frame line;

processor data output means associated with said channel processor synchronized with respect to said first clock signal for placing data onto said data bus;

processor data input means associated with said channel processor, coupled to said second segment of said second clock line, being responsive to and synchronized with respect to said second clock signal for reading data from said data bus;

device data input means associated with each of said devices responsive to said first clock signal and said first frame signal for reading data from said data bus synchronously with respect to said first clock signal subject to validation by said first frame signal; and device data output means associated with each of said devices responsive to said second clock signal and said second frame signal for placing data onto said data bus synchronously with respect to said second clock signal subject to validation by said second frame signal.

14. In a data communication system wherein a channel processor may communicate with a plurality of devices coupled in parallel at sequential points along a data bus, an improved data timing system comprising:

a first clock line originating at said channel processor and extending to a termination point beyond the last of said devices;

means for coupling said devices to said first clock line in the same sequence as that in which said devices are coupled to said data bus;

a second clock line having a segment extending from a turnaround point beyond the last of said devices toward said channel processor;

means for coupling said devices to said segment in the reverse sequence to that in which said devices are coupled to said data bus;

means associated with said channel processor for generating a first clock signal propagating along said first clock line away from said channel processor while being controlled by said channel processor; and means associated with said channel processor for generating a second clock signal propagating along said segment of said second clock line toward said channel processor while being controlled by said channel processor, said first and second clock signals being characterized by a common predetermined frequency.

15. The invention of claim 14 wherein said second clock line has an additional segment extending from said channel processor to said turnaround point, and wherein said second clock generating means comprises means for driving said additional segment at the channel processor end thereof at said predetermined frequency.

16. The invention of claim 14, and further comprising:

processor data output means associated with said channel processor synchronized with respect to said first clock signal for placing data onto said data bus;

processor data input means associated with said channel processor, coupled to said segment of said second clock line, being responsive to and synchronized with respect to said second clock signal for reading data from said data bus;

device data input means associated with each of said devices, being responsive to and synchronized with respect to said second clock signal for placing data onto said data bus; and device data output means associated with each of said devices, being responsive to and synchronized with respect to said second clock signal for placing data onto said data bus;

whereupon data transfers from said channel processor to said devices are timed by said first clock signal while data transfers from said devices to said channel processor are timed by said second clock signal.

17. A method of synchronizing data transfers between a channel processor and a plurality of peripheral devices coupled in parallel at sequential points along the data bus, comprising the steps of:

providing a first clock line coupled to the devices in the same sequence as that in which the data bus is coupled to the devices;

providing a second clock line, at least a segment of which extends from a point remote from the channel processor toward the channel processor, coupled to the devices in the reverse sequence to that in which the data bus is coupled to the devices;

generating a first clock signal which propagates along the first clock line away from the channel processor while being controlled by the channel processor; and generating a second clock signal which propagates along the segment of the second clock line toward the channel processor while being controlled by the channel processor, the first and second clock signals being generated at a common predetermined frequency.

18. The invention of claim 17, and further comprising the steps of:

providing a first frame line coupled to the devices in the same sequence as that in which the data bus is coupled to the devices;

providing a second frame line, at least a segment of which extends from a point remote from the channel processor toward the channel processor, coupled to the devices in the reverse sequence to that in which the data bus is coupled to the devices;

generating a first frame signal which propagates along the first clock line away from the channel processor while being controlled by the channel processor to signify the start of a new bus operation and allow a receiving device to validate its taking data off the data bus; and generating a second frame signal which propagates along the segment of the second clock line toward the channel processor while being controlled by the channel processor to allow a sending device to validate its placing data on the data bus.

19. The invention of claim 17, and further comprising the step, carried out at one of the devices, of:

reading data off the data bus synchronously with respect to the first clock signal.

20. The invention of claim 17, and further comprising the step, carried out at one of the devices, of:

placing data onto the data bus synchronously with respect to the second clock signal.

* * * * *